US012583159B2

(12) United States Patent
Hano et al.

(10) Patent No.: US 12,583,159 B2
(45) Date of Patent: Mar. 24, 2026

(54) CONTROLLER FOR INJECTION MOLDING MACHINE AND MANAGEMENT SYSTEM FOR INJECTION MOLDING MACHINE

(71) Applicant: SUMITOMO HEAVY INDUSTRIES, LTD., Tokyo (JP)

(72) Inventors: Katsunobu Hano, Chiba (JP); Tomonori Horikawa, Chiba (JP); Takuya Matsunaga, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 233 days.

(21) Appl. No.: 18/533,953

(22) Filed: Dec. 8, 2023

(65) Prior Publication Data

US 2024/0217153 A1 Jul. 4, 2024

(30) Foreign Application Priority Data

Dec. 28, 2022 (JP) ................................. 2022-211675

(51) Int. Cl.
B29C 45/76 (2006.01)
B29C 37/00 (2006.01)
(52) U.S. Cl.
CPC ........ B29C 45/76 (2013.01); B29C 2037/906 (2013.01); B29C 2045/7606 (2013.01); B29C 2945/76066 (2013.01); B29C 2945/76939 (2013.01)
(58) Field of Classification Search
CPC .................. B29C 2045/7606; B29C 2037/906
See application file for complete search history.

(56) References Cited

U.S. PATENT DOCUMENTS

| | | | |
|---|---|---|---|
| 2004/0044434 A1 | 3/2004 | Morimura | |
| 2021/0107194 A1 | 4/2021 | Kusakabe et al. | |
| 2021/0141366 A1 | 5/2021 | Yamaguchi et al. | |
| 2022/0379538 A1* | 12/2022 | Atsuta | B29C 45/768 |
| 2023/0202087 A1* | 6/2023 | Mitsuma | B29C 45/766 |
| | | | 425/135 |
| 2023/0264401 A1* | 8/2023 | Hosomoto | B29C 45/76 |
| | | | 700/200 |
| 2023/0339159 A1* | 10/2023 | Atsuta | B29C 45/76 |

FOREIGN PATENT DOCUMENTS

| | | |
|---|---|---|
| JP | 2006-248038 | 9/2006 |
| JP | 2007-047981 | 2/2007 |
| JP | 2007-196390 | 8/2007 |
| JP | 2009-140449 | 6/2009 |
| JP | 2012-030386 | 2/2012 |
| JP | 2021-062504 | 4/2021 |
| JP | 2021-077147 | 5/2021 |

* cited by examiner

*Primary Examiner* — John J DeRusso
(74) *Attorney, Agent, or Firm* — IPUSA, PLLC

(57) ABSTRACT

A controller for an injection molding machine includes processing circuitry. The processing circuitry is configured to store, in a storage, information on an action taken on the injection molding machine, user information indicating a user who has taken the action, and information on time for taking the action in association with each other, with respect to each of actions taken on the injection molding machine. The processing circuitry is further configured to refer to the storage to display, on a display, the number of actions taken by the user or time required for taking the actions by the user in a visually recognizable manner using a figure, with respect to each of users indicated in the user information.

7 Claims, 12 Drawing Sheets

FIG.4

| CONDITION NAME | STOP CONTENT | TYPE | WORKER | TOTAL TIME | STOP TIME | RESTART TIME |
|---|---|---|---|---|---|---|
| MOLD1 | CYCLE ERROR | ERROR | USER C | 0:36:16 | 2022/6/12 15:12 | 2022/6/12 15:58 |
| MOLD1 | MOLDED PRODUCT CHECK ERROR | ERROR | USER B | 1:25:18 | 2022/6/12 13:46 | 2022/6/12 15:11 |
| MOLD2 | SETUP | MANUAL | USER B | 0:59:43 | 2022/6/12 12:45 | 2022/6/12 13:45 |
| MOLD1 | PLANNED OUTAGE | MANUAL | - | 3:37:39 | 2022/6/12 7:15 | 2022/6/12 10:53 |
| MOLD1 | MOLD PROTECTION | ERROR | USER B | 0:06:28 | 2022/6/10 16:22 | 2022/6/10 16:28 |
| MOLD1 | ACCESSORY EQUIPMENT ERROR (STOCKER) | ERROR | USER A | 0:03:48 | 2022/6/10 12:41 | 2022/6/10 12:44 |
| MOLD1 | MOLD CLEANING | MANUAL | USER A | 0:15:35 | 2022/6/10 10:54 | 2022/6/10 11:09 |
| MOLD1 | EQUIPMENT REPAIR | MANUAL | USER C | 1:45:35 | 2022/6/10 8:54 | 2022/6/10 10:40 |
| MOLD1 | CHUCK ERROR | MANUAL | USER B | 0:05:27 | 2022/6/9 16:22 | 2022/6/9 16:28 |
| MOLD1 | OUT OF RESIN | MANUAL | USER B | 0:18:54 | 2022/6/9 12:41 | 2022/6/9 12:44 |
| MOLD1 | CYCLE ERROR | ERROR | USER B | 1:46:23 | 2022/6/9 8:54 | 2022/6/9 10:40 |
| MOLD1 | RUNNER CLOGGING | MANUAL | USER A | 0:45:14 | 2022/6/8 15:12 | 2022/6/8 15:58 |
| MOLD1 | SCREW CLEANING | MANUAL | USER A | 1:24:56 | 2022/6/8 13:46 | 2022/6/8 15:11 |
| MOLD2 | CYCLE ERROR | ERROR | USER A | 1:00:12 | 2022/6/8 12:45 | 2022/6/8 13:45 |
| MOLD1 | FILLING PEAK PRESSURE ERROR | ERROR | USER C | 0:15:08 | 2022/6/8 10:54 | 2022/6/8 11:09 |
| MOLD1 | MOLD PROTECTION | ERROR | USER A | 3:37:59 | 2022/6/8 7:15 | 2022/6/8 10:53 |

FIG.5

| CONDITION NAME | CHANGE TIME | CHANGE ITEM | BEFORE CHANGE | AFTER CHANGE | CHANGER | CHANGE REASON |
|---|---|---|---|---|---|---|
| PARTS3 | 2022/7/27 13:45 | VP SWITCHOVER POSITION | 1.8 | 1.5 | USER A | SHORT SHOT |
| PARTS3 | 2022/7/27 13:38 | VP SWITCHOVER POSITION | 2 | 1.8 | USER A | SHORT SHOT |
| PARTS3 | 2022/7/27 13:37 | CALCULATION COMPLETION POSITION | 45 | 45.5 | USER A | SHORT SHOT |
| PARTS3 | 2022/7/27 13:36 | HEATER Z1 TEMPERATURE | 230 | 220 | USER A | SHORT SHOT |
| PARTS3 | 2022/7/27 13:27 | HEATER Z1 TEMPERATURE | 220 | 230 | USER A | SHORT SHOT |
| PARTS3 | 2022/7/26 16:12 | VP SWITCHOVER POSITION | 2.3 | 2 | USER B | SHORT SHOT |
| PARTS3 | 2022/7/26 16:07 | VP SWITCHOVER POSITION | 2.5 | 2.3 | USER B | SHORT SHOT |
| PARTS3 | 2022/7/25 11:19 | VP SWITCHOVER POSITION | 2.7 | 2.5 | USER C | SHORT SHOT |
| PARTS3 | 2022/7/25 11:15 | VP SWITCHOVER POSITION | 3 | 2.7 | USER C | SHORT SHOT |
| PARTS3 | 2022/7/25 11:09 | CALCULATION COMPLETION POSITION | 44.5 | 45 | USER C | SHORT SHOT |
| PARTS2 | 2022/7/25 8:09 | DWELLING PRESSURE | 20 | 25 | USER A | SINK MARK |
| PARTS2 | 2022/7/25 8:09 | DWELLING TIME | 0.5 | 0.8 | USER C | SINK MARK |
| PARTS2 | 2022/7/24 18:12 | COOLING TIME | 1.5 | 1 | USER B | REDUCING CYCLE TIME |
| PARTS2 | 2022/7/23 9:37 | FILLING PRESSURE | 50 | 80 | USER B | BURR |
| PARTS1 | 2022/7/23 9:35 | CALCULATION COMPLETION POSITION | 55 | 60 | USER C | BURR |
| PARTS1 | 2022/7/23 9:31 | HEATER Z2 TEMPERATURE | 200 | 210 | USER B | CHANGE RESIN LOT |
| PARTS1 | 2022/7/23 9:31 | HEATER Z1 TEMPERATURE | 180 | 200 | USER C | CHANGE RESIN LOT |

CONTROLLER FOR INJECTION MOLDING MACHINE AND MANAGEMENT SYSTEM FOR INJECTION MOLDING MACHINE

CROSS-REFERENCE TO RELATED APPLICATION

This application is based upon and claims priority to Japanese Patent Application No. 2022-211675, filed on Dec. 28, 2022, the entire contents of which are incorporated herein by reference.

BACKGROUND

Technical Field

The present disclosure relates to controllers for an injection molding machine and management systems for an injection molding machine.

Description of Related Art

In the injection molding machine, conditions such as various setting values and molding materials related to the operation of the molding machine complicatedly affect production of molded products. Therefore, in the injection molding machine, there has been proposed a technique of extracting the change history of a setting item value related to the molding condition which is changed when a defective product was molded and displaying the change history, so that the defective product is not continuously molded. Thus, the influence of the change in the setting items on the molding condition can be recognized in a short time.

SUMMARY

According to an aspect of the present disclosure, a controller for an injection molding machine includes processing circuitry. The processing circuitry is configured to store, in a storage, information on an action taken on the injection molding machine, user information indicating a user who has taken the action, and information on time for taking the action in association with each other, with respect to each of actions taken on the injection molding machine. The processing circuitry is further configured to refer to the storage to display, on a display, the number of actions taken by the user or time required for taking the actions by the user in a visually recognizable manner using a figure, with respect to each of users indicated in the user information.

BRIEF DESCRIPTION OF THE DRAWINGS

FIG. 4 is a diagram illustrating a table structure of a stop history recording part according to the embodiment;

FIG. 5 is a diagram illustrating a table structure of a molding condition change history recording part according to the embodiment;

DETAILED DESCRIPTION

Figure 1:
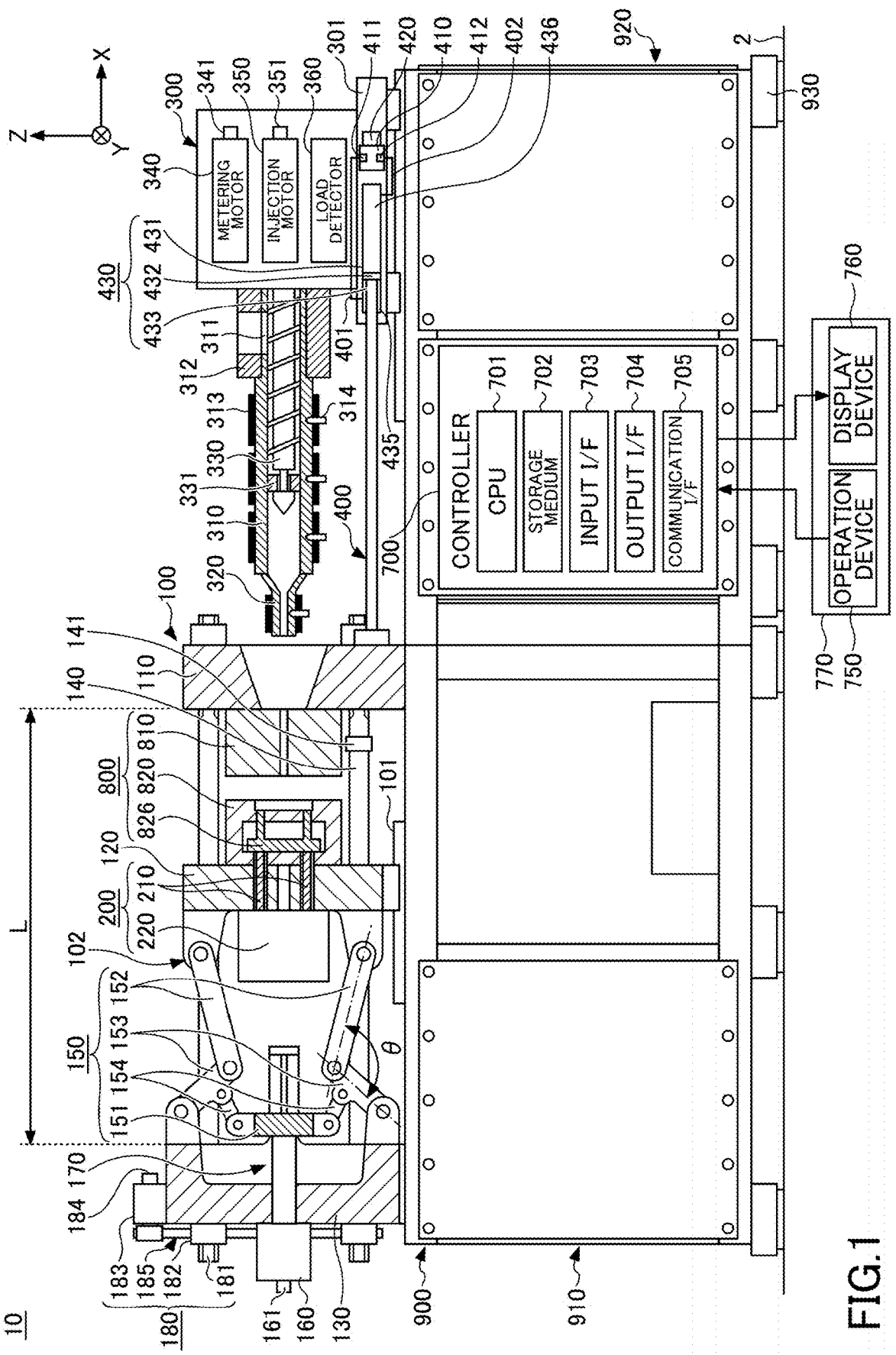
FIG. 1 is a diagram illustrating the state of an injection molding machine according to an embodiment at the completion of mold opening.

According to the above-described related-art technique, the change history of the setting values of the setting items is merely displayed, and it is difficult to recognize a factor causing a decrease in the utilization of the injection molding machine.

Particularly, in an injection molding machine, conditions for producing molded products so as not to produce a defected product complicatedly affect production. Therefore, in order to increase the utilization, a user's proficiency level or skills are important. That is, by recognizing the number of times that the injection molding machine was stopped or the number of times that the molding condition was changed, or the time required from the stopping of the injection molding machine to the start of molding for each user, it is considered that it becomes easy to know the factor causing a decrease in the utilization.

An aspect of the present disclosure provides a technique to increase the utilization of an injection molding machine by recognizing a factor causing a decrease in the utilization by graphically displaying information on an action taken on the injection molding machine for each user.

According to an aspect of the present disclosure, a technique to increase the utilization of an injection molding machine by recognizing a factor causing a decrease in the utilization can be provided.

Embodiments of the present disclosure will be described with reference to the drawings. The embodiments described below are not intended to limit the disclosure, and all the features and combinations described in the embodiments are not necessarily essential to the disclosure. In the drawings, the same or corresponding configurations are referred to using the same or corresponding numerals, and a description thereof may be omitted.

Figure 2:
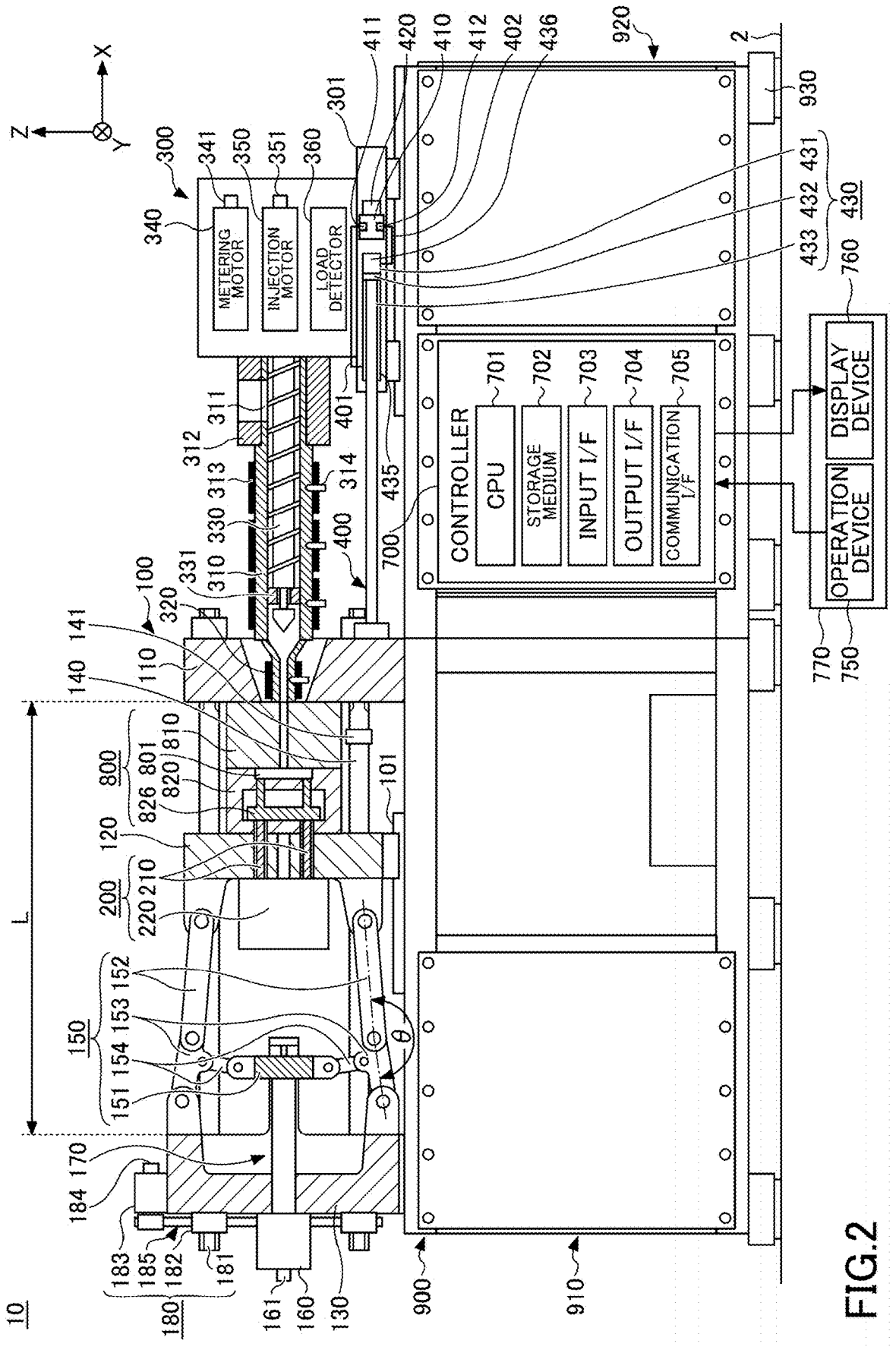
FIG. 2 is a view illustrating the state of the injection molding machine according to the embodiment during mold clamping.

FIG. 1 is a diagram illustrating the state of the injection molding machine according to an embodiment at the completion of mold opening. FIG. 2 is a diagram illustrating the state of the injection molding machine according to this embodiment during mold clamping. In this specification, the X-axis direction, the Y-axis direction, and the Z-axis direction are perpendicular to each other. The X-axis direction and the Y-axis direction represent horizontal directions, and the Z-axis direction represents a vertical direction. When a mold clamping part 100 is a horizontal type, the X-axis direction is a mold opening/closing direction, and the Y-axis direction is a widthwise direction of an injection molding machine 10. The negative side in the Y-axis direction is referred to as "operation side", and the positive side in the Y-axis direction is referred to as "non-operation side."

As illustrated in FIG. 1 and FIG. 2, the injection molding machine 10 includes the mold clamping part 100 that opens and closes a mold part 800, an ejector 200 that ejects a molding product molded in the mold part 800, an injection part 300 that injects a molding material into the mold part 800, a movement part 400 that moves the injection part 300 toward and away from the mold part 800, a controller (control part) 700 that controls the components of the injection molding machine 10, and a frame 900 that supports the components of the injection molding machine 10. The frame 900 includes a mold clamping part frame 910 that supports the mold clamping part 100 and an injection part frame 920 that supports the injection part 300. Each of the mold clamping part frame 910 and the injection part frame 920 is installed on a floor 2 via at least one leveling adjuster 930. The controller 700 (an example of processing circuitry) is placed in the internal space of the injection part frame 920. Each component of the injection molding machine 10 is described below.

(Mold Clamping Part)

In the description of the mold clamping part 100, the direction of movement of a movable platen 120 during mold closing (for example, the positive X-axis direction) is referred to as "forward direction", and the direction of movement of the movable platen 120 during mold opening (for example, the negative X-axis direction) is referred to as "backward direction."

The mold clamping part 100 closes, pressurizes, clamps, depressurizes, and opens the mold part 800. The mold part 800 includes a stationary mold 810 and a movable mold 820. The mold clamping part 100 is, for example, a horizontal type, and the mold opening and closing directions are horizontal directions. The mold clamping part 100 includes a stationary platen 110 to which the stationary mold 810 is attached, the movable platen 120 to which the movable mold 820 is attached, and a movement mechanism 102 that moves the movable platen 120 in the mold opening and closing directions relative to the stationary platen 110.

The stationary platen 110 is fixed to the mold clamping part frame 910. The stationary mold 810 is attached to a surface of the stationary platen 110 that faces the movable platen 120.

The movable platen 120 is placed to be movable in the mold opening and closing directions relative to the mold clamping part frame 910. A guide 101 that guides the movable platen 120 is laid on the mold clamping part frame 910. The movable mold 820 is attached to a surface of the movable platen 120 that faces the stationary platen 110.

The movement mechanism 102 moves the movable platen 120 toward and away from the stationary platen 110 to close, pressurize, clamp, depressurize, and open the mold part 800. The movement mechanism 102 includes a toggle support 130 spaced apart from the stationary platen 110, a tie bar 140 connecting the stationary platen 110 and the toggle support 130, a toggle mechanism 150 that moves the movable platen 120 in the mold opening and closing directions relative to the toggle support 130, a mold clamping motor 160 that actuates the toggle mechanism 150, a motion conversion mechanism 170 that converts the rotary motion of the mold clamping motor 160 into linear motion, and a mold thickness adjustment mechanism 180 that adjusts the interval between the stationary platen 110 and the toggle support 130.

The toggle support 130 is spaced apart from the stationary platen 110 and is placed on the mold clamping part frame 910 to be movable in the mold opening and closing directions. The toggle support 130 may be placed to be movable along a guide laid on the mold clamping part frame 910. The guide 101 of the movable platen 120 may also serve as the guide of the toggle support 130.

According to this embodiment, the stationary platen 110 is fixed to the mold clamping part frame 910 and the toggle support 130 is placed to be movable in the mold opening and closing directions relative to the mold clamping part frame 910. However, the toggle support 130 may be fixed to the mold clamping part frame 910 and the stationary platen 110 may be placed to be movable in the mold opening and closing directions relative to the mold clamping part frame 910.

The tie bar 140 connects the stationary platen 110 and the toggle support 130 with an interval (distance) L therebetween in the mold opening and closing directions. Multiple (for example, four) tie bars may be used as the tie bar 140. The multiple tie bars 140 are placed parallel to the mold opening and closing directions and extend according to a mold clamping force. At least one tie bar 140 among the multiple tie bars 140 may be provided with a tie bar strain detector 141 that detects the strain of the tie bar 140. The tie bar strain detector 141 transmits a signal indicating the detection result to the controller 700. The detection result of the tie bar strain detector 141 is used to detect the mold clamping force.

According to this embodiment, the tie bar strain detector 141 is used as a mold clamping force detector to detect a mold clamping force. The present disclosure, however, is not limited to this configuration. The mold clamping force detector is not limited to a strain gauge type and may be a piezoelectric type, a capacitive type, a hydraulic type, an electromagnetic type, or the like, and its attachment position is not limited to the tie bar 140.

The toggle mechanism 150 is placed between the movable platen 120 and the toggle support 130, and moves the movable platen 120 in the mold opening and closing directions relative to the toggle support 130. The toggle mechanism 150 includes a crosshead 151 that moves in the mold opening and closing directions and a pair of link groups that are extended and contracted by the movement of the crosshead 151. Each link group includes a first link 152 and a second link 153 that are extendably and contractibly connected by a pin or the like. The first link 152 is pivotably attached to the movable platen 120 with a pin or the like. The second link 153 is pivotably attached to the toggle support 130 with a pin or the like. The second link 153 is attached to the crosshead 151 via a third link 154. The crosshead 151 is moved toward or away from the toggle support 130 to contract or extend the first link 152 and the second link 153 to move the movable platen 120 toward or away from the toggle support 130.

The configuration of the toggle mechanism 150 is not limited to the configuration illustrated in FIG. 1 and FIG. 2. For example, the number of nodes of each link group, which is five in FIG. 1 and FIG. 2, may be four, and one end of the third link 154 may be connected to the node of the first link 152 and the second link 153.

The mold clamping motor 160 is attached to the toggle support 130 to actuate the toggle mechanism 150. The mold clamping motor 160 moves the crosshead 151 toward or away from the toggle support 130 to contract or extend the first link 152 and the second link 153 to move the movable platen 120 toward or away from the toggle support 130. The mold clamping motor 160, which is directly connected to the motion conversion mechanism 170, may alternatively be connected to the motion conversion mechanism 170 via a belt or pulley.

The motion conversion mechanism 170 converts the rotational motion of the mold clamping motor 160 into the linear motion of the crosshead 151. The motion conversion mechanism 170 includes a screw shaft and a screw nut screwed to the screw shaft. Balls or rollers may be interposed between the screw shaft and the screw nut.

The mold clamping part 100 performs a mold closing process, a pressurizing process, a mold clamping process, a depressurizing process, a mold opening process, and the like under the control of the controller 700.

In the mold closing process, the mold clamping motor 160 is driven to move the crosshead 151 forward to a mold closing completion position at a set travel speed to move the movable platen 120 forward to cause the movable mold 820 to touch the stationary mold 810. The position and travel speed of the crosshead 151 are detected using a mold clamping motor encoder 161, for example. The mold clamping motor encoder 161 detects the rotation of the mold clamping motor 160 and transmits a signal indicating the detection results to the controller 700.

A crosshead position detector that detects the position of the crosshead 151 and a crosshead travel speed detector that detects the travel speed of the crosshead 151 are not limited to the mold clamping motor encoder 161 and common ones may be employed.

Furthermore, a movable platen position detector that detects the position of the movable platen 120 and a movable platen travel speed detector that detects the travel speed of the movable platen 120 are not limited to the mold clamping motor encoder 161 and common ones may be employed.

In the pressurizing process, the mold clamping motor 160 is further driven to further move the crosshead 151 from the mold closing completion position to a mold clamping position, thereby generating a mold clamping force.

In the mold clamping process, the mold clamping motor 160 is driven to maintain the position of the crosshead 151 at the mold clamping position. In the mold clamping process, the mold clamping force generated in the pressurizing process is maintained. In the mold clamping process, a cavity space 801 (see FIG. 2) is formed between the movable mold 820 and the stationary mold 810, and the injection part 300 fills the cavity space 801 with a liquid molding material. The molding material is solidified, so that a molding product is obtained.

The number of cavity spaces 801 may be one or more. In the latter case, multiple molding products are simultaneously obtained. An insert material may be placed in part of the cavity space 801 and the molding material may fill another part of the cavity space 801. Thereby, a molding product into which the insert material and the molding material are integrated is obtained.

In the depressurizing process, the mold clamping motor 160 is driven to move the crosshead 151 backward from the mold clamping position to a mold opening start position to move the movable platen 120 backward to reduce the mold clamping force. The mold opening start position and the mold closing completion position may be the same position.

In the mold opening process, the mold clamping motor 160 is driven to move the crosshead 151 backward from the mold opening start position to a mold opening completion position at a set travel speed to move the movable platen 120 backward to separate the movable mold 820 from the stationary mold 810. Thereafter, the ejector 200 ejects the molding product from the movable mold 820.

Set conditions in the mold closing process, the pressurizing process, and the mold clamping process are collectively set as a series of set conditions. For example, the travel speed and positions (including a mold closing start position, a travel speed switch position, the mold closing completion position, and the mold clamping position) of the crosshead 151 and the mold clamping force in the mold closing process and the pressurizing process are collectively set as a series of set conditions. The mold closing start position, the travel speed switch position, the mold closing completion position, and the mold clamping position, which are arranged in this order in the forward direction from the back side, represent the start points and end points of sections for which the travel speed is set. The travel speed is set section by section. There may be one or more travel speed switch positions. The travel speed switch position may not be set. Only one of the mold clamping position and the mold clamping force may be set.

Setting conditions in the depressurizing process and the mold opening process are likewise set. For example, the travel speed and positions (the mold opening start position, the travel speed switch position, and the mold opening completion position) of the crosshead 151 in the depressurizing process and the mold opening process are collectively set as a series of set conditions. The mold opening start position, the travel speed switch position, and the mold opening completion position, which are arranged in this order in the backward direction from the front side, represent the start points and end points of sections for which the travel speed is set. The travel speed is set section by section. There may be one or more travel speed switch positions. The travel speed switch position may not be set. The mold opening start position and the mold closing completion position may be the same position. The mold opening completion position and the mold closing start position may be the same position.

Instead of the travel speed, position, etc., of the crosshead 151, the travel speed, position, etc., of the movable platen 120 may be set. Furthermore, instead of the crosshead position (for example, the mold clamping position) or the movable platen position, the mold clamping force may be set.

The toggle mechanism 150 amplifies the driving force of the mold clamping motor 160 and transmits the amplified driving force to the movable platen 120. The amplification factor is also referred to as "toggle multiplying factor." The toggle multiplying factor changes according to the angle θ formed by the first link 152 and the second link 153 (hereinafter also referred to as "link angle θ"). The link angle θ is determined from the position of the crosshead 151. The toggle multiplying factor is maximized when the link angle θ is 180°.

When there is a change in the thickness of the mold part 800 because of the replacement of the mold part 800 or a change in the temperature of the mold part 800, the mold thickness is adjusted to obtain a predetermined mold clamping force at the time of mold clamping. In adjusting the mold thickness, for example, the interval L between the stationary platen 110 and the toggle support 130 is adjusted so that the link angle θ of the toggle mechanism 150 becomes a predetermined angle at the time of mold touch when the movable mold 820 touches the stationary mold 810.

The mold clamping part 100 includes the mold thickness adjustment mechanism 180. The mold thickness adjustment mechanism 180 adjusts the mold thickness by adjusting the interval L between the stationary platen 110 and the toggle support 130. The mold thickness is adjusted between the end of a molding cycle and the start of the next molding cycle, for example. The mold thickness adjustment mechanism 180 includes, for example, a threaded shaft 181 formed at the rear end of each tie bar 140, a threaded nut 182 held on the toggle support 130 in such a manner as to be rotatable and impossible to move forward or backward, and a mold thickness adjustment motor 183 that rotates the threaded nut 182 mating with the threaded shaft 181.

The threaded shaft 181 and the threaded nut 182 are provided for each tie bar 140. The rotational driving force of the mold thickness adjustment motor 183 may be transmitted to the multiple threaded nuts 182 via a rotational driving force transmission part 185. It is possible to synchronously rotate the multiple threaded nuts 182. The multiple threaded nuts 182 may be individually rotated by changing the transmission channel of the rotational driving force transmission part 185. The rotational driving force transmission part 185 is constituted of, for example, gears. In such a case, a driven gear is formed on the periphery of each threaded nut 182, a drive gear is attached to the output shaft of the mold thickness adjustment motor 183, and an intermediate gear that meshes with the driven gears and the drive gear is rotatably held in the center of the toggle support 130. The rotational driving force transmission part 185 may be constituted of a belt and pulleys instead of gears.

The operation of the mold thickness adjustment mechanism 180 is controlled by the controller 700. The controller 700 drives the mold thickness adjustment motor 183 to rotate the threaded nuts 182. As a result, the position of the toggle support 130 relative to the tie bars 140 is adjusted, and the interval L between the stationary platen 110 and the toggle support 130 is adjusted. Multiple mold thickness adjustment mechanisms may be used in combination.

The interval L is detected using a mold thickness adjustment motor encoder 184. The mold thickness adjustment motor encoder 184 detects the amount of rotation and the direction of rotation of the mold thickness adjustment motor 183, and transmits a signal indicating the detection results to the controller 700. The detection results of the mold thickness adjustment motor encoder 184 are used to monitor and control the position of the toggle support 130 and the interval L. A toggle support position detector that detects the position of the toggle support 130 and an interval detector that detects the interval L are not limited to the mold thickness adjustment motor encoder 184 and common ones may be employed.

The mold clamping part 100 may include a mold temperature controller that controls the temperature of the mold part 800. The mold part 800 contains a flow path for a temperature control medium. The mold temperature controller controls the temperature of the mold part 800 by controlling the temperature of the temperature control medium supplied to the flow path of the mold part 800.

The mold clamping part 100, which is a horizontal type whose mold opening and closing directions are horizontal directions according to this embodiment, may also be a vertical type whose mold opening and closing directions are vertical directions.

The mold clamping part 100, which includes the mold clamping motor 160 as a drive source according to this embodiment, may also include a hydraulic cylinder instead of the mold clamping motor 160. Furthermore, the mold clamping part 100 may include a linear motor for mold opening and closing and may include an electromagnet for mold clamping.

(Ejector)

In the description of the ejector 200, the same as in the description of the mold clamping part 100, the direction of movement of the movable platen 120 during mold closing (for example, the positive X-axis direction) is referred to as "forward direction", and the direction of movement of the movable platen 120 during mold opening (for example, the negative X-axis direction) is referred to as "backward direction."

The ejector 200 is attached to the movable platen 120 and moves forward and backward together with the movable platen 120. The ejector 200 includes one or more ejector rods 210 that eject a molding product from the mold part 800 and a drive mechanism 220 that moves the ejector rod 210 in the directions of movement (the X-axis direction) of the movable platen 120.

Each ejector rod 210 is placed in a through hole of the movable platen 120 to be movable forward and backward. The front end of the ejector rod 210 contacts an ejector plate 826 of the movable mold 820. The front end of the ejector rod 210 may be either connected to or disconnected from the ejector plate 826.

The drive mechanism 220 includes, for example, an ejector motor and a motion conversion mechanism that converts the rotary motion of the ejector motor into the linear motion of the ejector rod 210. The motion conversion mechanism includes a threaded shaft and a threaded nut that mates with the threaded shaft. Balls or rollers may be interposed between the threaded shaft and the threaded nut.

The ejector 200 executes an ejection process under the control of the controller 700. In the ejection process, the ejector rods 210 are moved forward from a standby position to an ejection position at a set travel speed to move the ejector plate 826 forward to eject a molding product. Thereafter, the ejector motor is driven to move the ejector rods 210 backward at a set travel speed to move the ejector plate 826 backward to the initial standby position.

The position and travel speed of the ejector rods 210 are detected using an ejector motor encoder, for example. The ejector motor encoder detects the rotation of the ejector motor to transmit a signal indicating the detection results to the controller 700. An ejector rod position detector that detects the position of the ejector rods 210 and an ejector rod travel speed detector that detects the travel speed of the ejector rods 210 are not limited to the ejector motor encoder and common ones may be employed.

(Injection Part)

Unlike in the description of the mold clamping part 100 and the ejector 200, in the description of the injection part 300, the direction of movement of a screw 330 during filling (for example, the negative X-axis direction) is referred to as "forward direction", and the direction of movement of the screw 330 during metering (for example, the positive X-axis direction) is referred to as "backward direction."

The injection part 300 is installed on a slidable base 301, and the slidable base 301 is so placed as to be movable forward and backward relative to the injection part frame 920. The injection part 300 is so placed as to be movable toward and away from the mold part 800. The injection part 300 touches the mold part 800 to fill the cavity space 801 within the mold part 800 with a molding material metered in a cylinder 310. The injection part 300 includes, for example, the cylinder 310 that heats a molding material, a nozzle 320 provided at the front end of the cylinder 310, the screw 330 so placed in the cylinder 310 as to be movable forward and backward and rotatable, a metering motor 340 that rotates the screw 330, an injection motor 350 that moves the screw 330 forward and backward, and a load detector 360 that detects a load transmitted between the injection motor 350 and the screw 330.

The cylinder 310 heats a molding material supplied to the inside through a supply port 311. Examples of molding materials include resin. The molding material is formed into pellets, for example, and is supplied to the supply port 311 in a solid state. The supply port 311 is formed in a rear portion of the cylinder 310. A cooler 312 such as a water-cooled cylinder is provided on the outer cylindrical surface of the rear portion of the cylinder 310. Heaters 313 such as a band heater and temperature detectors 314 are provided forward of the cooler 312 on the outer cylindrical surface of the cylinder 310.

The cylinder 310 is divided into multiple zones in the axial direction (the X-axis direction, for example) of the cylinder 310. Each zone is provided with the heater 313 and the temperature detector 314. A temperature is set for each zone and the controller 700 controls the heater 313 so that the temperature detected by the temperature detector 314 equals the set temperature.

The nozzle 320 is provided at the front end of the cylinder 310 to be pressed against the mold part 800. The heater 313 and the temperature detector 314 are provided on the periphery of the nozzle 320. The controller 700 controls the heater 313 so that the detected temperature of the nozzle 320 equals a set temperature.

The screw 330 is placed in the cylinder 310 to be rotatable and movable forward and backward. When the screw 330 rotates, a molding material is fed forward along the helical groove of the screw 330. The molding material is gradually melted by heat from the cylinder 310 as the molding material is fed forward. As the molding material in liquid form is fed forward on the screw 330 to be accumulated in the front of the cylinder 310, the screw 330 is moved backward. Thereafter, when the screw 330 is moved forward, the molding material in liquid form accumulated in front of the screw 330 is injected into the mold part 800 through the nozzle 320.

A backflow prevention ring 331 is so attached to a front portion of the screw 330 as to be movable forward and backward as a backflow check valve that prevents the backflow of the molding material from the front to the back of the screw 330 when the screw 330 is pushed forward.

When the screw 330 is moved forward, the backflow prevention ring 331 is pushed backward by the pressure of the molding material in front of the screw 330 to move backward relative to the screw 330 to a closing position (see FIG. 2) that closes the flow channel of the molding material, thereby preventing the backflow of the molding material accumulated in front of the screw 330 in the backward direction.

When the screw 330 is rotated, the backflow prevention ring 331 is pushed forward by the pressure of the molding material fed forward along the helical groove of the screw 330 to move forward relative to the screw 330 to an open position (see FIG. 1) that opens the flow channel of the molding material. As a result, the molding material is fed forward of the screw 330.

The backflow prevention ring 331 may be either a co-rotating type that rotates together with the screw 330 or a non-co-rotating type that does not rotate together with the screw 330.

The injection part 300 may include a drive source that moves the backflow prevention ring 331 forward and backward between the open position and the closing position relative to the screw 330.

The metering motor 340 rotates the screw 330. The drive source that rotates the screw 330 is not limited to the metering motor 340 and may be, for example, a hydraulic pump.

The injection motor 350 moves the screw 330 forward and backward. A motion conversion mechanism that converts the rotary motion of the injection motor 350 into the linear motion of the screw 330, etc., are provided between the injection motor 350 and the screw 330. The motion conversion mechanism includes, for example, a threaded shaft and a threaded nut that mates with the threaded shaft. Balls or rollers may be provided between the threaded shaft and the threaded nut. The drive source that moves the screw 330 forward and backward is not limited to the injection motor 350, and may be, for example, a hydraulic cylinder.

The load detector 360 detects a load transmitted between the injection motor 350 and the screw 330. The detected load is converted into pressure in the controller 700. The load detector 360 is provided in the load transmission path between the injection motor 350 and the screw 330 to detect a load applied to the load detector 360.

The load detector 360 transmits a signal of the detected load to the controller 700. The load detected by the load detector 360 is converted into pressure applied between the screw 330 and the molding material, and is used to control and monitor a pressure that the screw 330 receives from the molding material, a back pressure against the screw 330, a pressure applied from the screw 330 to the molding material, etc.

A pressure detector that detects the pressure of a molding material is not limited to the load detector 360 and a common one may be employed. For example, a nozzle pressure sensor or a cavity pressure sensor may be employed. The nozzle pressure sensor is placed in the nozzle 320. The cavity pressure sensor is placed within the mold part 800.

The injection part 300 executes processes such as a metering process, a filling process, and a dwelling process under the control of the controller 700. The filling process and the dwelling process may be collectively referred to as "injection process."

In the metering process, the metering motor 340 is driven to rotate the screw 330 at a set rotational speed to feed a molding material forward along the helical groove of the screw 330. With this, the molding material is gradually melted. As the molding material in liquid form is fed forward of the screw 330 to be accumulated in the front portion of the cylinder 310, the screw 330 is moved backward. The rotational speed of the screw 330 is detected using a metering motor encoder 341, for example. The metering motor encoder 341 detects the rotation of the metering motor 340 and transmits a signal indicating the detection results to the controller 700. A screw rotational speed detector that detects the rotational speed of the screw 330 is not limited to the metering motor encoder 341 and a common one may be employed.

In the metering process, in order to restrict a sudden backward movement of the screw 330, the injection motor 350 may be driven to apply a set back pressure to the screw 330. The back pressure to the screw 330 is detected using the load detector 360, for example. When the screw 330 is moved backward to a metering completion position and a predetermined amount of molding material is accumulated in front of the screw 330, the metering process is completed.

The position and rotational speed of the screw 330 in the metering process are collectively set as a series of set conditions. For example, a metering start position, a rotational speed switch position, and the metering completion position are set. These positions, which are arranged in this order in the backward direction from the front side, represent the start points and end points of sections for which the rotational speed is set. The rotational speed is set section by section. There may be one or more rotational speed switch positions. The rotational speed switch position may not be set. Furthermore, a back pressure is set for each section.

In the filling process, the injection motor 350 is driven to move the screw 330 forward at a set travel speed to fill the cavity space 801 within the mold part 800 with the molding material in liquid form accumulated in front of the screw 330. The position and travel speed of the screw 330 are detected using an injection motor encoder 351, for example. The injection motor encoder 351 detects the rotation of the injection motor 350 and transmits a signal indicating the detection results to the controller 700. When the position of the screw 330 reaches a set position, the filling process switches to the dwelling process (so-called V/P switchover). The position at which V/P switchover occurs may be referred to as "V/P switchover position". The set travel speed of the screw 330 may be changed according to the position of the screw 330, time, etc.

The position and travel speed of the screw 330 in the filling process are collectively set as a series of set conditions. For example, a filling start position (also referred to as "injection start position"), a travel speed switch position, and the V/P switchover position are set. These positions, which are arranged in this order in the forward direction from the back side, represent the start points and end points of sections for which the travel speed is set. The travel speed is set section by section. There may be one or more travel speed switch positions. The travel speed switch position may not be set.

The upper limit value of the pressure of the screw 330 is set for each section for which the travel speed of the screw 330 is set. The pressure of the screw 330 is detected by the load detector 360. When the pressure of the screw 330 is less than or equal to a set pressure, the screw 330 is moved forward at a set travel speed. When the pressure of the screw 330 exceeds the set pressure, the screw 330 is moved forward at a travel speed lower than the set travel speed so that the pressure of the screw 330 is less than or equal to the set pressure, for mold protection.

In the filling process, after the position of the screw 330 reaches the V/P switchover position, the screw 330 may be temporarily stopped at the V/P switchover position and the V/P switchover may be thereafter performed. Immediately before the V/P switchover, the screw 330 may be moved forward or backward very slowly instead of being stopped. A screw position detector that detects the position of the screw 330 and a screw travel speed detector that detects the travel speed of the screw 330 are not limited to the injection motor encoder 351 and common ones may be employed.

In the dwelling process, the injection motor 350 is driven to push the screw 330 forward to hold the pressure of the molding material at the front end of the screw 330 (hereinafter also referred to as "dwell pressure") at a set pressure and press the molding material remaining in the cylinder 310 toward the mold part 800. It is possible to compensate for a shortage of molding material due to cooling contracture within the mold part 800. The dwell pressure is detected using the load detector 360, for example. The set value of the dwell pressure may be changed according to elapsed time from the start of the dwelling process, etc. Two or more values may be set for each of the dwell pressure and the dwell time for holding the dwell pressure in the dwelling process, and the dwell pressure and the dwell time may be collectively set as a series of set conditions.

In the dwelling process, the molding material in the cavity space 801 within the mold part 800 is gradually cooled, so that the entrance of the cavity space 801 is filled up with the solidified molding material when the dwelling process is completed. This state, which is referred to as "gate seal," prevents the backflow of the molding material from the cavity space 801. After the dwelling process, the cooling process is started. In the cooling process, the molding material in the cavity space 801 is solidified. The metering process may be executed during the cooling process in order to reduce molding cycle time.

The injection part 300, which is an in-line screw type according to this embodiment, may be a screw preplasticizing type. According to the screw preplasticizing injection part, a molding material melted in a plasticizing cylinder is supplied to an injection cylinder, and the molding material is injected into a mold part from the injection cylinder. In the plasticizing cylinder, a screw is so placed as to be rotatable and immovable forward or backward or a screw is so placed as to be rotatable and movable forward and backward. In the injection cylinder, a plunger is so placed as to be movable forward and backward.

Furthermore, the injection part 300, which is a horizontal type where the axial direction of the cylinder 310 is a horizontal direction according to this embodiment, may be a vertical type where the axial direction of the cylinder 310 is a vertical direction. A mold clamping part combined with the injection part 300 of a vertical type may be either a horizontal type or a vertical type. Likewise, a mold clamping part combined with the injection part 300 of a horizontal type may be either a horizontal type or a vertical type.

(Moving Part)

In the description of the movement part 400, the same as in the description of the injection part 300, the direction of movement of the screw 330 during filling (for example, the negative X-axis direction) is referred to as "forward direction", and the direction of movement of the screw 330 during metering (for example, the positive X-axis direction) is referred to as "backward direction."

The movement part 400 moves the injection part 300 toward and away from the mold part 800. Furthermore, the movement part 400 presses the nozzle 320 against the mold part 800 to generate a nozzle touch pressure. The movement part 400 includes a hydraulic pump 410, a motor 420 serving as a drive source, and a hydraulic cylinder 430 serving as a hydraulic actuator.

The hydraulic pump 410 includes a first port 411 and a second port 412. The hydraulic pump 410, which is a bidirectionally rotatable pump, switches the rotational direction of the motor 420 to take in hydraulic fluid (for example, oil) from one of the first port 411 and the second port 412 and discharge hydraulic fluid from the other of the first port 411 and the second port 412, thereby generating hydraulic pressure. The hydraulic pump 410 may take in hydraulic fluid from a tank and discharge hydraulic fluid from one of the first port 411 and the second port 412.

The motor 420 causes the hydraulic pump 410 to operate. The motor 420 drives the hydraulic pump 410 with a rotational direction and a rotation torque corresponding to a control signal from the controller 700. The motor 420 may be an electric motor and may be an electric servo motor.

The hydraulic cylinder 430 includes a cylinder body 431, a piston 432, and a piston rod 433. The cylinder body 431 is fixed to the injection part 300. The piston 432 separates the inside of the cylinder body 431 into a front chamber 435 serving as a first chamber and a rear chamber 436 serving as a second chamber. The piston rod 433 is fixed to the stationary platen 110.

The front chamber 435 of the hydraulic cylinder 430 is connected to the first port 411 of the hydraulic pump 410 via a first flow channel 401. Hydraulic fluid discharged from the first port 411 is supplied to the front chamber 435 via the first flow channel 401 to push the injection part 300 forward. The injection part 300 is moved forward to press the nozzle 320 against the stationary mold 810. The front chamber 435 serves as a pressure chamber that generates the nozzle touch pressure of the nozzle 320 with the pressure of the hydraulic fluid supplied from the hydraulic pump 410.

The rear chamber 436 of the hydraulic cylinder 430 is connected to the second port 412 of the hydraulic pump 410 via a second flow channel 402. Hydraulic fluid discharged from the second port 412 is supplied to the rear chamber 436 of the hydraulic cylinder 430 via the second flow channel 402 to push the injection part 300 backward. The injection part 300 is moved backward to separate the nozzle 320 from the stationary mold 810.

According to this embodiment, the movement part 400 includes the hydraulic cylinder 430. The present disclosure, however, is not limited to this. For example, instead of the hydraulic cylinder 430, an electric motor and a motion conversion mechanism that converts the rotary motion of the electric motor into the linear motion of the injection part 300 may be employed.

(Controller)

The controller 700, which is composed of, for example, a computer, includes a central processing unit (CPU) 701, a storage medium 702 such as a memory, an input interface (I/F) 703, an output interface (I/F) 704, and a communication interface 705 as illustrated in FIG. 1 and FIG. 2. The controller 700 executes various controls by causing the CPU 701 to execute one or more programs stored in the storage medium 702. Furthermore, the controller 700 receives an external signal at the input interface 703 and transmits a signal to the outside at the output interface 704. The controller 700 also transmits information to an external device at the communication interface 705.

The controller 700 repeatedly manufacture a molding product by repeatedly executing processes such as the metering process, the mold closing process, the pressurizing process, the mold clamping process, the filling process, the dwelling process, the cooling process, the depressurizing process, the mold opening process, and the ejection process. A series of operations for obtaining a molding product, for example, operations from the start of a metering process and the start of the next metering process, may be referred to as "shot" or "molding cycle." Furthermore, time required for one shot may be referred to as "molding cycle time" or "cycle time."

One molding cycle has, for example, the metering process, the mold closing process, the pressurizing process, the mold clamping process, the filling process, the dwelling process, the cooling process, the depressurizing process, the mold opening process, and the ejection process in this order. The order here is order in which the processes are started. The filling process, the dwelling process, and the cooling process are executed during the mold clamping process. The start of the mold clamping process may coincide with the start of the filling process. The completion of the depressurizing process coincides with the start of the mold opening process.

Multiple processes may be synchronously executed to reduce the molding cycle time. For example, the metering process may be executed during the cooling process of the previous molding cycle or may be executed during the mold clamping process. In such a case, the mold closing process may be executed at the beginning of the molding cycle. Furthermore, the filling process may be started during the mold closing process. Furthermore, the ejection process may be started during the mold opening process. When an on-off valve that opens and closes the flow path of the nozzle 320 is provided, the mold opening process may be started during the metering process. This is because even when the mold opening process is started during the metering process, no molding material leaks from the nozzle 320 as long as the on-off valve closes the flow path of the nozzle 320.

One molding cycle may include one or more processes other than the metering process, the mold closing process, the pressurizing process, the mold clamping process, the filling process, the dwelling process, the cooling process, the depressurizing process, the mold opening process, and the ejection process.

For example, before the start of the metering process after the completion of the dwelling process, a pre-metering suck back process to move the screw 330 backward to a preset metering start position may be executed. This makes it possible to reduce the pressure of the molding material accumulated in front of the screw 330 before the start of the metering process and to prevent a sudden backward movement of the screw 330 at the start of the metering process.

Furthermore, before the start of the filling process after the completion of the metering process, a post-metering suck back process to move the screw 330 backward to a preset filling start position (also referred to as "injection start position") may be executed. This makes it possible to reduce the pressure of the molding material accumulated in front of the screw 330 before the start of the filling process and to prevent the leakage of the molding material from the nozzle 320 before the start of the filling process. The controller 700 is connected to an operating device 750 that receives an input operation and a display device 760 that displays a screen. The operating device 750 and the display device 760 may be composed of, for example, a touchscreen 770 as a one-piece structure. The touchscreen 770 serving as the display device 760 displays a screen under the control of the controller 700. For example, information such as the settings of the injection molding machine 10 and the current condition of the injection molding machine 10 may be displayed in the screen of the touchscreen 770. An input operation on a screen region displayed in the touchscreen 770 can be received. For example, operation parts such as buttons and input fields for receiving a worker's input operation may be displayed in the screen region of the touchscreen 770. The touchscreen 770 serving as the operating device 750 detects a worker's input operation on the screen and outputs a signal according to the input operation to the controller 700. This enables the worker to, for example, enter the settings (including setting values) for the injection molding machine 10 by operating the operation parts provided in the screen while checking information displayed on the screen. Furthermore, by operating the operation parts provided in the screen, the worker can cause the injection molding machine 10 to perform operations corresponding to the operation parts. The operations of the injection molding machine 10 may be, for example, the operations (including stopping) of the mold clamping part 100, the ejector 200, the injection part 300, the movement part 400, etc. Furthermore, the operations of the injection molding machine 10 may be the switching of the screen displayed on the touchscreen 770 serving as the display device 760, etc.

The operating device 750 and the display device 760 of this embodiment, which are described as being integrated into the touchscreen 770, may be separately provided. Furthermore, two or more operating devices 750 may be provided. The operating device 750 and the display device 760 are disposed on the operation side (the negative side in the Y-axis direction) of the mold clamping part 100 (more specifically, the stationary platen 110).

An Embodiment

Figure 3:
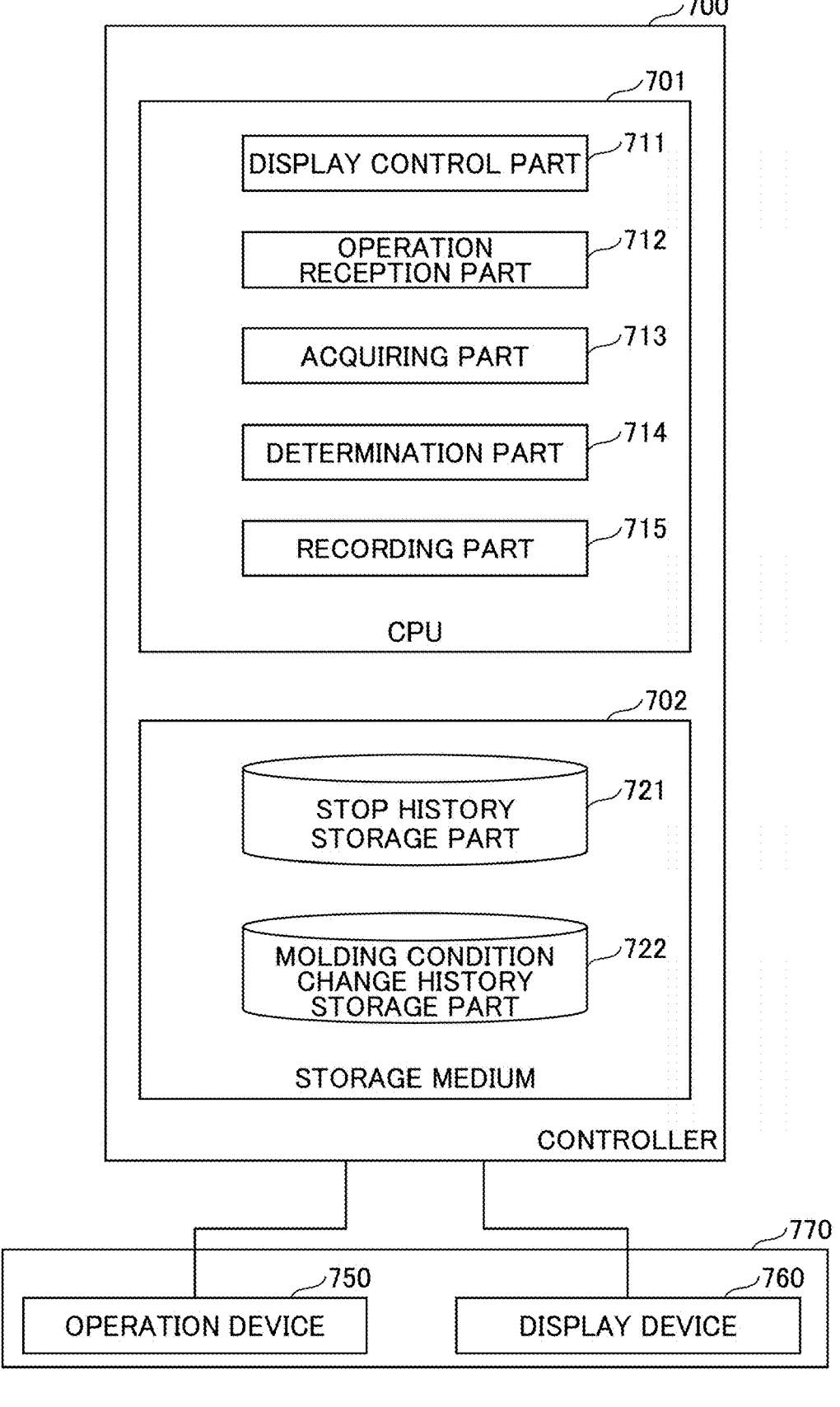
FIG. 3 is a functional block diagram of a controller of the injection molding machine according to the embodiment.

FIG. 3 is a functional block diagram of the controller 700 of the injection molding machine 10 according to an embodiment. The functional blocks illustrated in FIG. 3 are conceptual and do not have to be physically configured as illustrated. All or some of the functional blocks may be functionally or physically distributed or integrated in desired parts. Processing functions executed in the functional blocks are entirely or partly as desired executed by one or more programs executed in the CPU 701. Furthermore, the functional blocks may be implemented in hardware wired logic. As illustrated in FIG. 3, the CPU 701 of the controller 700 includes a display control part 711, an operation reception part 712, an acquiring part 713, a determination part 714, and a recording part 715. The controller 700 includes a stop history storage part 721 and a molding condition change history storage part 722 in the storage medium 702.

The display control part 711 performs control for displaying information on the display device 760. For example, the display control part 711 performs control to display a setting screen for changing the setting of the injection molding machine 10. The display control part 711 also displays history based on the information stored in the stop history storage part 721 and the molding condition change history storage part 722 on the screen.

The operation reception part 712 receives an input operation to the operation device 750.

For example, the operation reception part 712 receives an operation for setting a screen to be displayed on the display device 760. The display control part 711 performs control to display a screen in accordance with the received operation.

The acquiring part 713 acquires a signal (an example of information) indicating the detection results from various sensors provided in the injection molding machine 10. For example, when the injection molding machine 10 is stopped due to an error (abnormality), the acquiring part 713 acquires, from various sensors provided in the injection molding machine 10, a signal from which the type of the error occurring in the injection molding machine 10 can be determined.

When the injection molding machine 10 is stopped due to an error, the determination part 714 determines the type of error occurring in the injection molding machine 10 based on the signal acquired by the acquiring part 713. In this embodiment, the types of error include, for example, cycle error, mold protection, molded product check error, accessory equipment error (stocker), and filling peak pressure error. However, any error occurring in the injection molding machine 10 can be determined. Furthermore, the determination part 714 can detect a stop time which is the time the injection molding machine 10 is stopped from the signal transmitted.

Each time the injection molding machine 10 is stopped, the recording part 715 records, in the stop history storage part 721, the contents or details of a stop (to be a target of action such as work) (hereinafter "stop content"), a user ID of a worker who has performed work in response to the stop, and information on time required for taking the work responsive to the stop, in association with each other. In this embodiment, at least one of a stopping of the injection molding machine 10 by an operation of a worker and a stopping of the injection molding machine 10 based on an error detected in the injection molding machine 10 is included as the stopping of the injection molding machine.

According to this embodiment, the user ID is an example of user information indicating a user. The user information may be assigned as an ID to identify each changer (person who changes settings) or each worker like a user ID, or one piece of information to be shared by multiple persons. In this embodiment, an example in which the user ID identifies a changer or a worker is described, however, the user ID may be user information in which identification information is assigned to each group including multiple persons.

Every time a condition change (an example of work to be performed by a worker) is performed due to a molding failure or the like of the injection molding machine 10, the recording part 715 records information indicating contents of the condition change, a user ID of a changer who performed the condition change, and a time when the condition change was performed (an example of information on a time required for performing the condition change), in association with each other, in the molding condition change history storage part 722. For information recorded in association with a condition change, the user ID is recorded as the changer.

The user ID is the information for identifying the user who has logged in to the injection molding machine 10, and there is a case where the user who performed the work to respond to the stop changes the conditions of the injection molding machine 10. In such a case, the worker to be recorded in the stop history storage part 721 and the changer to be recorded in the molding condition change history storage part 722 have the same user ID.

In this embodiment, an example in which the recording part 715 records information in the stop history storage part 721 and the molding condition change history storage part 722 is described below. The recording of information performed by the recording part 715 of this embodiment is not limited to being performed on the stop history storage part 721 and the molding condition change history storage part 722, and may be performed on the stop history storage part 721 or the molding condition change history storage part 722, or may be performed on a recording part having another table configuration.

Furthermore, the recording performed by the recording part 715 of this embodiment may be recording of information on work desired to be displayed as a Pareto chart or the like.

According to this embodiment, a description is given of the case where information on the stopping of the injection molding machine 10 by a worker, the stopping of the injection molding machine 10 based on an error detected in the injection molding machine 10, and a change in the molding conditions of the injection molding machine 10 is stored in the storage medium 702 as information on actions taken on the injection molding machine 10. According to this embodiment, the information on actions stored in the storage medium 702 is not limited to information on the stopping of the injection molding machine 10 by a worker, the stopping of the injection molding machine 10 based on an error detected in the injection molding machine 10, and a change in the molding conditions of the injection molding machine 10, and may be any information on actions that require the stopping of the injection molding machine because of necessity of work by a worker or the like. In other words, the experience or skill of a worker or the like is necessary to take the actions. Therefore, according to this embodiment, the experience or skill of a worker or the like is determined by visualizing actions taken by the worker or the like on a worker basis, namely, worker by worker.

Next, the stop history storage part 721 and the molding condition change history storage part 722 are described below.

The stop history storage part 721 stores stop history of the injection molding machine 10. FIG. 4 is a diagram illustrating a table structure of the stop history storage part 721 according to this embodiment. The stop history storage part 721 according to this embodiment records information on the stopping of the injection molding machine 10 by a worker and the stopping of the injection molding machine 10 based on an error detected in the injection molding machine 10.

As illustrated in FIG. 4, the stop history storage part 721 stores a condition name, a stop content, a type, a worker (an example of user information indicating a user who performed the work), a total time, an occurrence time, and a restart time (an example of information on a time required for performing the work), in association with each other. In this embodiment, each time the injection molding machine 10 is stopped, a record is recorded to the stop history storage part 721 by the recording part 715. The example in FIG. 4 illustrates a part of the information stored in the stop history storage part 721.

The condition name is a name set for conditions for the injection molding machine 10 to mold a molded product, and is, for example, a name set for each molded product.

Information on the reason why the injection molding machine 10 is stopped is registered as the type. The types include "Manual" and "Error". "Manual" indicates that a worker manually stops the operation. "Error" indicates that the controller 700 stops based on the error detected at the time of molding.

As the stop content (an example of the information on the work), a content in which the injection molding machine 10 is stopped is registered. When the type is "Manual", the stop reason input from the operation device 750 is registered. When the type is "Error", information indicating the type of error determined by the determination part 714 is registered.

As the worker (an example of users who performed the work), information for identifying the worker who performed the work to respond to the stop while the injection molding machine 10 is stopped is registered. In this embodiment, when the injection molding machine 10 is stopped, a user who has logged in to the injection molding machine 10 to work to respond to the stop is set as the worker. Specifically, when the injection molding machine 10 is stopped due to an error, the user ID used to log in to the injection molding machine 10 to respond to the error is registered as the information indicating the worker. When the injection molding machine 10 is stopped by a worker, the user ID of the worker who stops the injection molding machine 10 is registered as the information indicating the worker.

The total time is a time calculated by a difference between a stop time and a restart time described below, and indicates a time required for performing the work to respond to the stopping of the injection molding machine 10. The difference between the stop time and the restart time may be calculated by the recording part 715.

The stop time indicates a time at which the injection molding machine 10 is stopped. The stop time includes a time when the injection molding machine 10 is stopped due to an error detected during molding and a time when the injection molding machine 10 is stopped by a worker.

The restart time indicates a time at which the work to respond to the stop is completed and molding by the injection molding machine 10 is started.

In this embodiment, as an example of a time required for performing the work to respond to the stopping of the injection molding machine 10, an example of managing the time which is the difference between the stop time and the restart time is described below. However, in this embodiment, the time required for performing the work to respond to the stop is not limited to the difference between the stop time and the restart time. For example, the time required for the work to respond to the stop may be a time from the occurrence of an error to the elimination of the error or a time from the worker's start of work to the completion of work.

The molding condition change history storage part 722 stores change history of the molding condition of the injection molding machine 10. FIG. 5 is a diagram illustrating a table structure of the molding condition change history storage part 722 according to this embodiment.

The molding condition change history storage part 722 stores a condition name, a change time, a change item, a parameter before the change, a parameter after the change, a changer, and a change reason, in association with one another. In this embodiment, each time the molding condition is changed in the injection molding machine 10, a record is recorded to the stop history recording part 722 by the recording part 715. The example in FIG. 5 illustrates a part of information stored in the molding condition change history storage part 722.

The condition name is a name set for conditions for the injection molding machine 10 to mold a molded product, and is, for example, a name set for each molded product.

The change time indicates a time at which the molding condition of a molded product is changed in the injection molding machine 10 by a changer. The changer according to this embodiment may be a person who has changed the molding condition. For example, in a case where one worker changes the molding condition as well as performing work to respond to the stop, the worker's user ID which is registered as a worker in the stop history storage part 721 may be registered as a changer in the molding condition change history storage part 722. The change item indicates an item which has been changed in the molding conditions (an example of the work). "Before change" indicates a parameter of the change item before the change. "After change" indicates a parameter of the change item after the change.

As the changer, information for identifying the changer who has changed the molding condition is registered. For example, the user ID of a user who has logged in to the injection molding machine 10 to change the molding condition of the injection molding machine 10 is registered as information indicating the changer.

As the change reason, information indicating the reason for changing the molding condition is registered. For example, when the operation reception part 712 receives inputs of a change reason together with a change of the molding condition from the user who has logged in to change the molding condition, the change reason is registered.

<Description of Screen>

In the injection molding machine 10 according to this embodiment, various screens can be displayed by providing the above-described configuration. For example, the display control part 711 may display a setting screen for generating a screen, which will be described later, on the display device 760. The screen may be displayed by any user, for example, by an administrator of a factory or the like in which the injection molding machine 10 is installed.

On the setting screen, the operation reception part 712 receives setting of a period to be displayed via the operation device 750. Specifically, the operation reception part 712 may receive selection of the type of graph to be displayed from a pull-down menu or the like displayed on the setting screen. When the operation reception part 712 receives the selection of the type of the graph to be displayed and then receives the pressing of the graph creation button, the display control part 711 displays the number of times that the work was performed or the time required for performing the work, in a form of the visually recognizable figure, on a display, as described later. Here, the form of the visually recognizable figure means that the number of times or the amount of time is expressed in a form of a figure. It includes those represented by a set of points and a set of points and lines, but excludes those represented only by characters, by numerals, or a combination of characters and numerals as in a table. A figure represented in this manner may be referred to as "represented figure". Furthermore, a part of a figure may be extracted and referred to as "element constituting a figure". An element constituting a figure refers to an element that can be distinguished from other elements constituting the figure, such as a bar in a bar graph or a Pareto chart, or a sector of a pie chart. In this embodiment, a case where a graph to be displayed is a Pareto chart is described below. The Pareto chart is a diagram in which a bar graph in which bars are sequenced in order of length (an example of a first figure) and a line graph indicating a cumulative percentage (an example of a second figure) are combined. Note that, in this embodiment, a Pareto chart is displayed as an example of display modes in the case of being represented by a figure, and a display mode other than the Pareto chart may be used. For example, the number of times that the work was performed or the time required for performing the work may be represented for each worker in a visually recognizable manner using a figure (any of various graphs) such as a bar graph, a pie chart, or a line graph. For example, in the case of a bar graph, the number of times of the work or the time required for performing the work for each worker may be represented as a bar. For example, in the case of a pie chart, the number of times that the work was performed or the time required for performing the work for each worker may be represented as a sector of a pie chart (hereinafter also referred to as "area"). For example, in the case of a line graph, the number of times that the work was performed or the time required for performing the work for each worker may be represented as a value on the graph.

Furthermore, in this embodiment, the types of the graph may be associated with the processes (for example, the metering process, the filling process, a dwelling process) of the injection molding machine 10. Accordingly, the operation reception part 712 may receive a selection of the process to present the types of the graph associated with the process before the type of the graph is selected. The operation reception part 712 may then receive a selection of the graph from the presented graph types. With this, it makes it easy to select the type of graph, thereby improving the operability.

The display control part 711 according to this embodiment displays a number of times that the work was performed or a time required for performing the work for each worker or changer, in a visually recognizable manner using a figure (for example, a Pareto chart), on the display 760 by referring to the stop history storage part 721 and the molding condition change history storage part 722.

Figure 6:
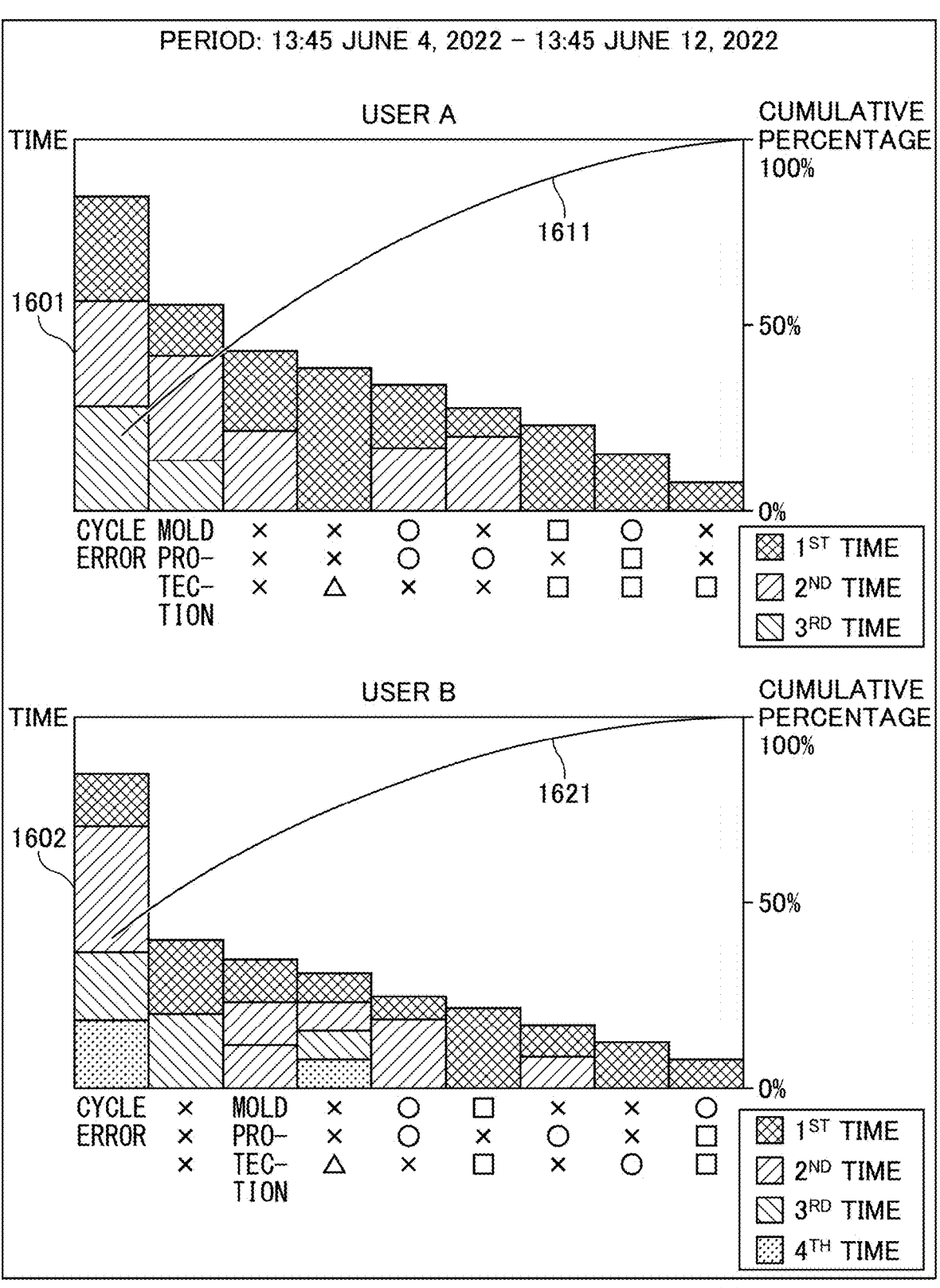
FIG. 6 is a diagram illustrating an example of the screen of error history by worker displayed on a display according to the embodiment.
Figure 7:
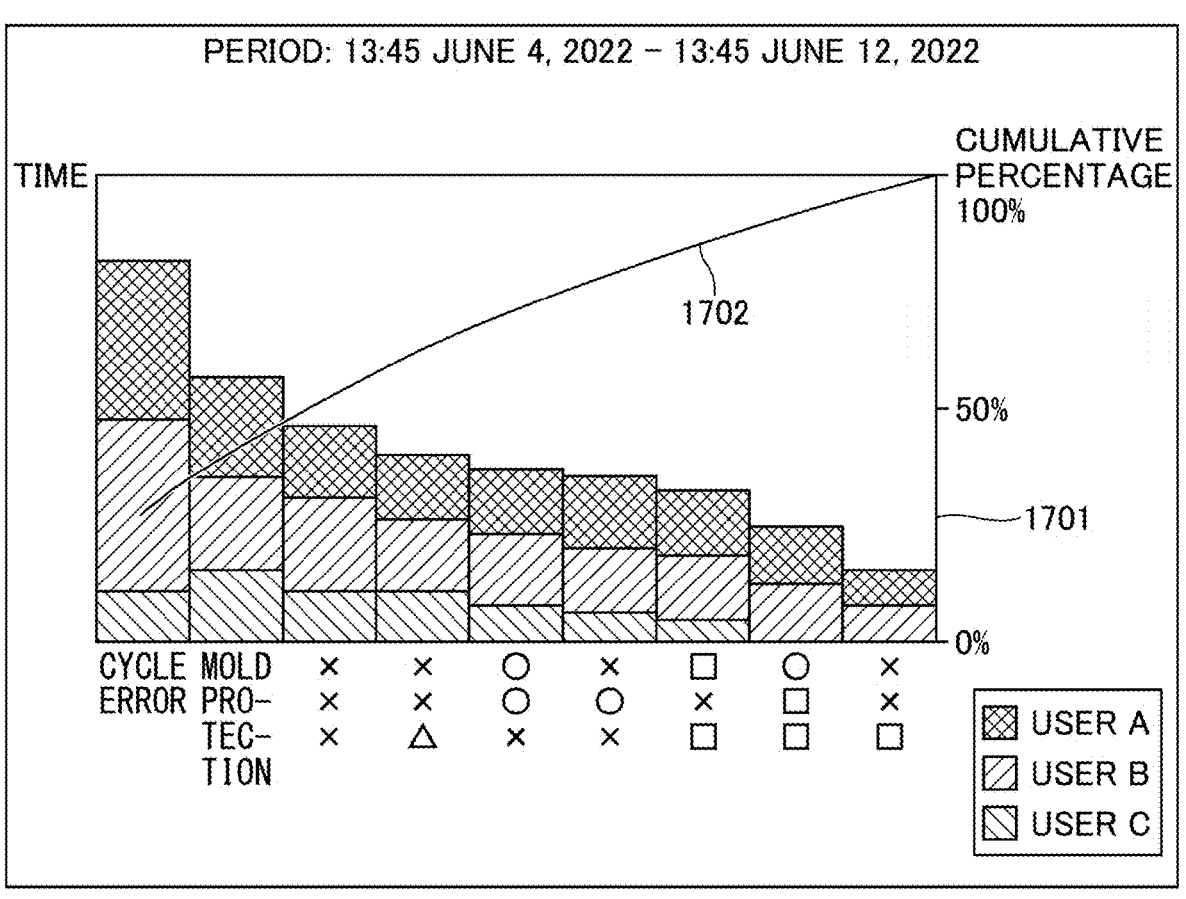
FIG. 7 is a diagram illustrating an example of the screen of error history displayed on the display according to the embodiment.
Figure 8:
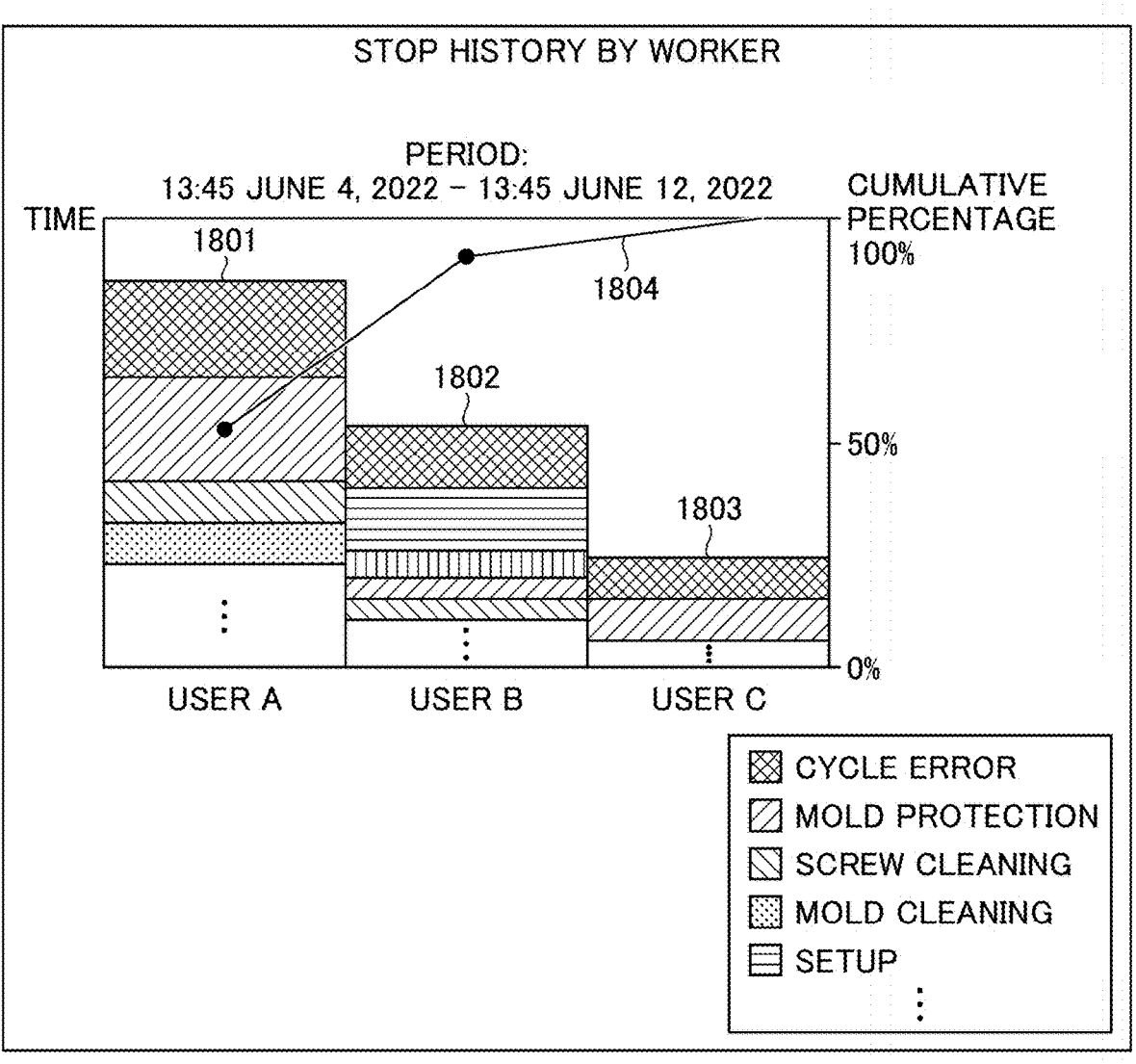
FIG. 8 is a diagram illustrating an example of the screen of stop history by worker displayed on the display according to the embodiment.
Figure 9:
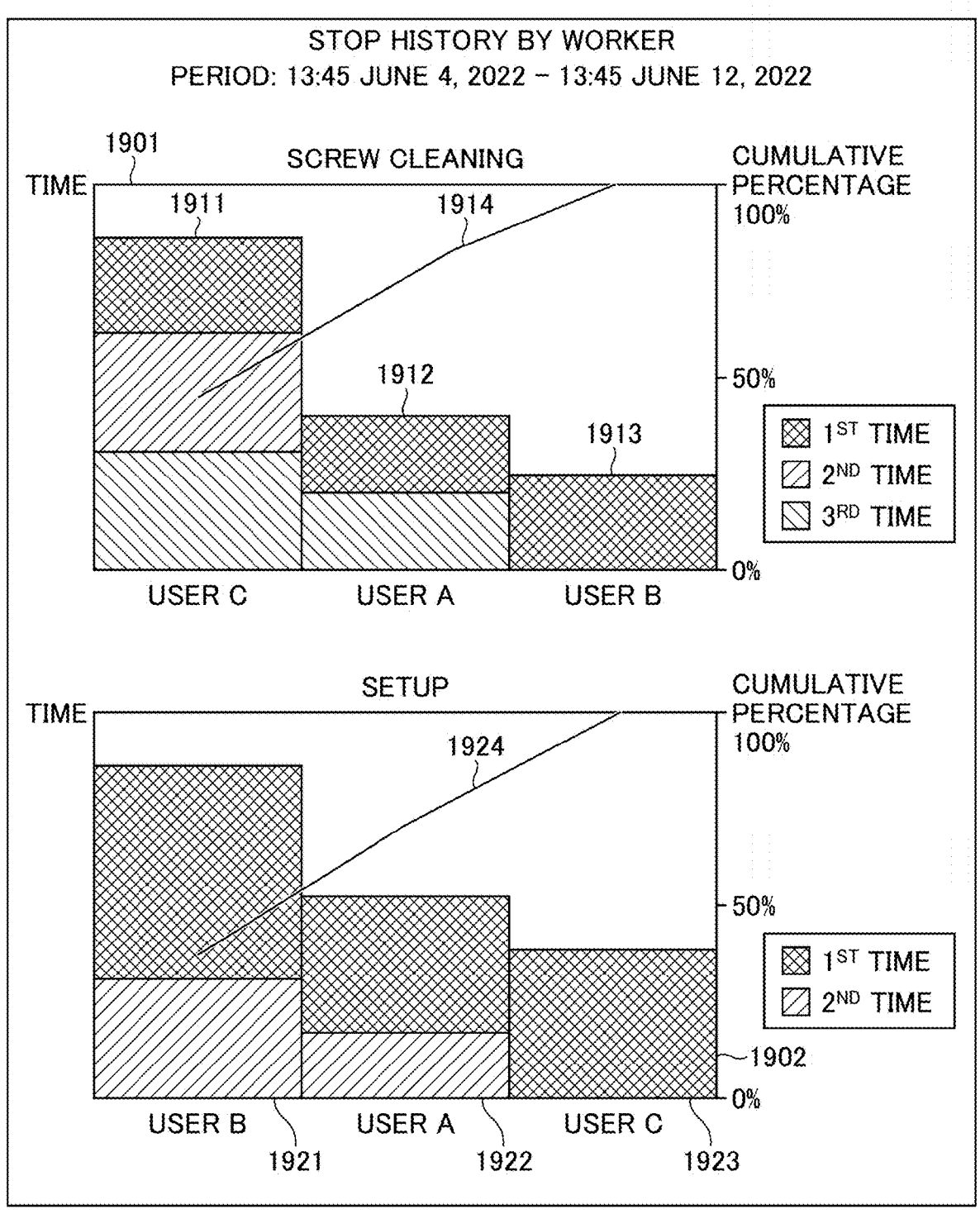
FIG. 9 is a diagram illustrating another example of the screen of the stop history by worker displayed on the display according to the embodiment.

FIG. 6 is a diagram illustrating an example of the screen of error history by worker displayed on the display device 760 according to this embodiment. In the example illustrated in FIG. 6, a Pareto chart (an example of graphs) representing history of the error occurred in a period from 13:45 on June 04 to 13:45 on Jun. 12, 2022 is illustrated separately for each worker. The Pareto charts of the error history illustrated in FIG. 6 are generated by referring to the stop history storage part 721 in FIG. 4, and a different Pareto chart is displayed for each worker. Since the Pareto charts illustrated in FIG. 7 to FIG. 9 are generated also by referring to the stop history storage part 721 in FIG. 4, the user illustrated in FIG. 7 to FIG. 9 indicates a worker.

A Pareto chart 1601 in FIG. 6 illustrates the error history when the worker is User A, and a Pareto chart 1602 illustrates the error history when the worker is User B. That is, the display control part 711 extracts one or more records of which the type is "Error" and which are within the set period from among the information stored in the stop history storage part 721, and displays the Pareto charts 1601 and 1602 generated for each worker. In the screen illustrated in FIG. 6, an example in which the error history for two workers are displayed is described, but the error history for one worker or three or more workers may be displayed. In this embodiment, by displaying the Pareto charts for multiple persons, the administrator can compare the workers with reference to the screen.

In each of the Pareto chart 1601 and the Pareto chart 1602, for each stop content (error content), the total time required for eliminating the respective errors is indicated by the length of a bar.

Furthermore, in the examples illustrated in the Pareto chart 1601 and the Pareto chart 1602, the bar representing the total time is sequenced in order of length of the bar according to the total time (the length of the bar), and displayed. In the same manner, for all Pareto charts according to this embodiment, the element constituting a figure is sequenced in descending order of the amount of the element, and displayed. Elements constituting a figure are as described above. In the examples illustrated in FIG. 6, the amount indicates a total time. In this embodiment, the amount is not limited to the total time, and may be, for example, information on the time including an average time, or the number of times. That is, the display control part 711 may sequence elements constituting a figure in descending order of the amount of the total time, the average time, or the number of times. Accordingly, for example, in the case of a bar graph or a Pareto chart, the amount is represented by the length of a bar and the bars may be displayed in order of length of the bar. In the case of a pie chart, the amount is represented by the size of the area and the areas may be displayed in order of size of the area. In the case of a line graph, the amount is represented by a value and the values may be displayed in descending order.

In the examples illustrated in FIG. 6, in a case where the error occurred multiple times, the total time of the multiple times is indicated by the length of the bar. In the examples illustrated in FIG. 6, in one bar, the time required for each time the error occurred is displayed in a different display mode (color or shading). For example, the bar indicating the cycle error in the Pareto chart 1601 indicates that the cycle error occurred three times. Furthermore, in the bar indicating the cycle error, the time required for eliminating the cycle error each time the cycle error occurred is displayed in a different display mode. Similarly, each of the other bars indicating the error content indicates the time required for eliminating the respective errors for each time the error occurred. With this displaying manner, the number of times that the error occurred and the time required for eliminating the error for each user can be recognized.

Furthermore, in the Pareto chart 1601, a polyline 1611 indicating the cumulative percentage of the total time for each error content is illustrated for User A, and in the Pareto chart 1602, a polyline 1621 indicating the cumulative percentage of the total time for each error content is illustrated for User B. In the Pareto chart 1601 and the Pareto chart 1602, the cumulative percentage of the total time for each error content will ultimately reach 100%. A user (for example, an administrator) who views the screen can recognize the proportion of the total time for each error content by visually recognizing the polyline 1611 or the polyline 1621.

That is, in the display illustrated in FIG. 6, each time an error occurred, the time required for eliminating the error by the worker can be recognized. It is also possible to recognize whether the worker has the skill to respond to the error and whether the worker has the skill capable of suppressing the occurrence of the error. Accordingly, the administrator can increase the utilization of the injection molding machine by confirming the required skill from the worker and instructing another worker of the skill.

This embodiment is not limited to the display of the screen illustrated in FIG. 6 as long as the time required for eliminating the error can be recognized for each worker. Next, another mode of the screen displaying the error history is described below.

FIG. 7 is a diagram illustrating an example of the screen of the error history displayed on the display device 760 according to this embodiment.

A Pareto chart 1701 of FIG. 7 illustrates history of the error occurred in the period from 13:45 on June 04 to 13:45 on Jun. 12, 2022 in the injection molding machine 10. That is, the display control part 711 extracts one or more records of which the type is "Error" and which are within the set period from among the information stored in the stop history storage part 721 to display the Pareto chart. The screen example in FIG. 7 illustrates a case where three workers use the injection molding machine 10.

In the Pareto chart 1701, the total time required for eliminating the error is displayed for each stop content (error content) by a bar graph.

In the example illustrated in FIG. 7, for each error content, the total time required for all workers to eliminate the respective errors is indicated by the length of a bar. A bar is generated for each error content. In the example illustrated in FIG. 7, the total time required for eliminating the error for each worker is displayed in a different display mode in one bar. For example, for the bar indicating the cycle error, the total time required for eliminating the error for each of User A, User B, and User C is displayed in a different display mode. With this displaying manner, the total time required for eliminating the respective errors for each user can be recognized.

In the example illustrated in the Pareto chart 1701, the bar representing the total time is sequenced in descending order according to the total time (the length of the bar) and displayed.

Furthermore, in the Pareto chart 1701, a polyline 1702 indicating the cumulative percentage of the total time for each error content is illustrated. In the Pareto chart 1701, the cumulative percentage of the total time for each error content will ultimately reach 100%. The user can recognize the proportion of the total time for each error content by referring to the polyline 1702.

That is, in the display illustrated in FIG. 7, the worker can recognize, for each worker, the total time required for eliminating the error by the worker. Accordingly, it is possible to recognize whether the worker has the skill to respond to the error and whether the worker has the skill capable of suppressing the occurrence of the error.

In the examples illustrated in FIG. 6 and FIG. 7, the total time required for eliminating the error is represented by the Pareto charts. However, in this embodiment, the figure for representing the total time required for eliminating the error is not limited to the Pareto chart, and the total time required for eliminating the error may be displayed by an element constituting the figure, such as a bar of a bar graph, a piece of a pie chart, or a value of a line graph. Furthermore, in the examples illustrated in FIG. 6 and FIG. 7, examples of the Pareto chart displayed in this embodiment are illustrated, and it is not limited to a mode in which the total time is displayed by the length of a bar of the Pareto chart. For example, the average time required for eliminating the error or the number of times that the error occurred may be displayed by a length of a bar of a Pareto chart or a bar graph, a piece of a pie chart, a value of a polyline, or the like. The bars in the Pareto chart may be displayed without being colored or shaded.

When the length of the bar of the Pareto chart represents the average time required for eliminating the error, the administrator can evaluate the skill or the efficiency of the worker for eliminating the error. In this embodiment, as a method of calculating the average time, for example, the average time may be calculated by dividing the total time by the number of times that the error occurred. Depending on the type of error, there may be errors occurring with a high frequency for each worker or machine, or errors occurring with a low frequency for each worker or each injection molding machine. Therefore, the method of calculating the average time is not limited to the method of calculating the average time by simply dividing the total time by the number of times that the error occurred. For example, the calculated average time may be adjusted with a calibration value according to the number of times, each worker, or each injection molding machine.

When the number of times that the error occurred is displayed by the length of the bar of the Pareto chart, the administrator can evaluate the frequency of the occurrence of the error for each worker. For example, the administrator investigates and confirms a work procedure or the like of a worker who has a high frequency of occurrence of the error to extract a reason for the occurrence of the error, and eliminates the cause, thereby increasing the utilization of the injection molding machine.

When the total time required for eliminating the error is displayed by the length of the bar of the Pareto chart, the administrator can evaluate the worker in comprehensive consideration of the frequency of the occurrence of the error and the time required for eliminating the error. That is, since it is possible to evaluate the skill or the efficiency of the worker and recognize the frequency of the occurrence of the error, the reason of the occurrence of the error can be extracted as described above and the work for eliminating the cause can be performed.

In the Pareto charts in FIG. 6 and FIG. 7, the case where the total time required for eliminating the error for each error content is displayed by the length of the bar is described above. However, in this embodiment, the Pareto chart is not limited to the mode in which the total time required for eliminating the error for each error content is displayed by the length of the bar. Next, an example will be described in which the total time required for eliminating the error for each worker is displayed by the length of a bar.

First, an example in which the operation reception part 712 receives the setting of the period to be displayed from the setting screen and then receives the selection of stop history by worker from a pull-down menu or the like is described. Thereafter, when the operation reception part 712 receives pressing of the graph creation button, the display control part 711 displays a screen to be described later.

FIG. 8 is a diagram illustrating an example of the screen of stop history by worker displayed on the display device 760 according to this embodiment. The example illustrated in FIG. 8 illustrates history of the stops that occurred in the period from 13:45 on June 04 to 13:45 on Jun. 12, 2022. Specifically, the display control part 711 according to this embodiment extracts records within the set period from the information stored in the stop history storage part 721, divides the extracted records for each worker, and then displays a Pareto chart in which the total time for each worker is represented by the length of the bar.

In other words, in a Pareto chart 1800 illustrated in FIG. 8, the total time for each worker is separately displayed as an item represented by a bar, which is a constituent element of a figure, assigning a different bar for each worker. The length of the bar indicates the total time required for the worker to restart the injection molding machine 10 after the machine is stopped.

In the Pareto chart 1800 of FIG. 8, a bar 1801 indicates the total time required until the restart in a case where User A is a worker, a bar 1802 indicates the total time required until the restart in a case where User B is a worker, and a bar 1803 indicates the total time required until the restart in a case where User C is a worker.

Each of the bar 1801, the bar 1802, and the bar 1803 is displayed in a different display mode (color or shading) for each stop content. Thus, the time required for each stop content can be recognized. With this displaying manner, the time required until the restart for each worker can be recognized for each stop content. In the example illustrated in the Pareto chart 1800, the bar representing the total time is sequenced in descending order according to the total time (the length of the bar), and displayed. The administrator can recognize the workers in the order of the total time by referring to the Pareto chart 1800.

Furthermore, in the Pareto chart 1800, a polyline 1804 indicating the cumulative percentage of the total time for each worker is illustrated. In the Pareto chart 1800, the cumulative percentage of the total time for each worker will ultimately reach 100%. The administrator can recognize the proportion of the total time for each worker by referring to the polyline 1804. That is, in the display illustrated in FIG. 8, it is possible to recognize the time required from the stop to the restart of the molding for each worker. Accordingly, with this displaying manner, the worker who decreases the utilization of the injection molding machine can be recognized. Furthermore, since which stop content requires time for the worker who has been recognized can be recognized, an increase in the utilization can be achieved by analyzing or the like of the work procedure related to the recognized stop content of the recognized worker who decreases the utilization.

In FIG. 8, the example in which the total time of all stop contents for each worker is illustrated in the Pareto chart has been described. However, the display of the total time for each worker is not limited to the example illustrated in FIG. 8. Next, an example in which a Pareto chart is displayed for each stop content and the total time for each worker is displayed in each chart will be described.

FIG. 9 is a diagram illustrating another example of the screen of the stop history by worker displayed on the display device 760 according to this embodiment. The example in FIG. 9 illustrates a Pareto chart of screw cleaning and setup that occurred in the period from 13:45 on June 04 to 13:45 on Jun. 12, 2022. A Pareto chart 1901 of FIG. 9 illustrates stop history of screw cleaning, and a Pareto chart 1902 illustrates stop history of setup. That is, the display control part 711 extracts one or more records of which the stop content is "Screw cleaning" and which are within the set period from among the information stored in the stop history storage part 721, and displays the Pareto chart of "Screw cleaning". The display control part 711 also extracts one or more records of which the stop content is "Setup" and which are within the set period from among the information stored in the stop history storage part 721, and displays the Pareto chart of "Setup".

In each of the Pareto chart 1901 and the Pareto chart 1902, for each worker, the total time required from the stop to the restart is indicated by the length of a bar.

In the Pareto chart 1901 of FIG. 9, a bar 1911 indicates the total time required from the stop being done for screw cleaning to the restart of the injection molding machine in a case where User C is a worker, a bar 1912 indicates the total time required from the stop being done for screw cleaning to the restart of the injection molding machine in a case where User A is a worker, and a bar 1913 indicates the total time required from the stop being done for screw cleaning to the restart of the injection molding machine in a case where User B is a worker.

In the Pareto chart 1902 of FIG. 9, a bar 1921 indicates the total time required until the restart after the stop in the setup in a case where User B is a worker, a bar 1922 indicates the total time required until the restart after the stop in the setup in a case where User A is a worker, and a bar 1923 indicates the total time required until the restart after the stop in the setup in a case where User C is a worker.

In the examples illustrated in FIG. 9, in a case where the stop indicated by the stop content occurred multiple times, the length of the bar for each worker indicates the total time of the multiple times. In the examples illustrated in FIG. 9, in one bar, the time required each time the error occurred is displayed in a different display mode (for example, shading or color). For example, in the Pareto chart 1901, in a case where the worker is User C, it can be recognized that the screw cleaning has been performed three times. Furthermore, the time required from the stop to the restart is illustrated for each of the three times. The bars indicating the other workers also indicate the time required for each occurrence of the error. With this displaying manner, the number of times that the stop occurred and the time required from the stop to the restart for each stop for each user can be recognized.

In the examples illustrated in the Pareto chart 1901 and the Pareto chart 1902, the bar representing the total time is sequenced in descending order according to the total time (the length of the bar) and displayed.

Furthermore, in the Pareto chart 1901, a polyline 1914 indicating the cumulative percentage of the total time for each worker is illustrated for "Screw cleaning", and in the Pareto chart 1902, a polyline 1924 indicating the cumulative percentage of the total time for each worker is illustrated for "Setup". In the Pareto chart 1901 and the Pareto chart 1902, the cumulative percentage of the total time for each worker will ultimately reach 100%. The administrator can recognize the proportion of the total time for each worker by referring to the polyline 1914 or the polyline 1924.

In the display illustrated in FIG. 9, it is possible to recognize the time required from the stop to the restart for each worker. Accordingly, the worker who decreases the utilization for each stop content can be recognized. Furthermore, an increase in the utilization can be achieved by analyzing or the like of the work procedure related to the recognized stop content of the recognized worker who decreases the utilization.

In the examples illustrated in FIG. 8 and FIG. 9, an example in which the total time required from the stop to the restart is represented by the Pareto chart for each worker has been described. However, in this embodiment, the figure for representing the total time required for eliminating the error is not limited to the Pareto chart, and the total time required from the stop to the restart may be displayed by an element constituting the figure, such as a bar of a bar graph, a piece of a pie chart, or a value of a line graph. Furthermore, the examples illustrated in FIG. 8 and FIG. 9 are not limited to the examples in which the total time for each worker is displayed by the length of the bar of the Pareto chart, and for example, the average time or the number of times that the stop occurred may be displayed by a length of a bar of a Pareto chart or a bar graph, a piece of a pie chart, a value of a polyline, or the like. As a method of calculating the average time, for example, the average time may be calculated by dividing the total time by the number of times that the stop occurred. Depending on the type of stop, there may be errors occurring with a high frequency for each worker or machine, or errors occurring with a low frequency for each worker or each injection molding machine. Therefore, the method of calculating the average time is not limited to the method of calculating the average time by simply dividing the total time by the number of times that the stop occurred. For example, the calculated average time may be adjusted with a calibration value according to the number of times, each worker, or each injection molding machine. The bars in the Pareto chart may be displayed without being colored or shaded. The effect in a case where the total time, the average time, or the number of times is represented by the length of the bar is as described above.

In FIG. 8 and FIG. 9, the case where the total time required from the stop to the restart for each worker is displayed in the Pareto chart has been described. However, this embodiment is not limited to the display of the Pareto chart regarding the time required from the stop to the restart. Next, a case where the change history of the molding condition is displayed as a Pareto chart will be described.

First, an example in which the operation reception part 712 receives the setting of the period to be displayed from the setting screen and then receives the selection of history of the number of changes in the molding condition from the pull-down menu or the like is described. Thereafter, when the operation reception part 712 receives pressing of the graph creation button, the display control part 711 displays a screen to be described later.

Figure 10:
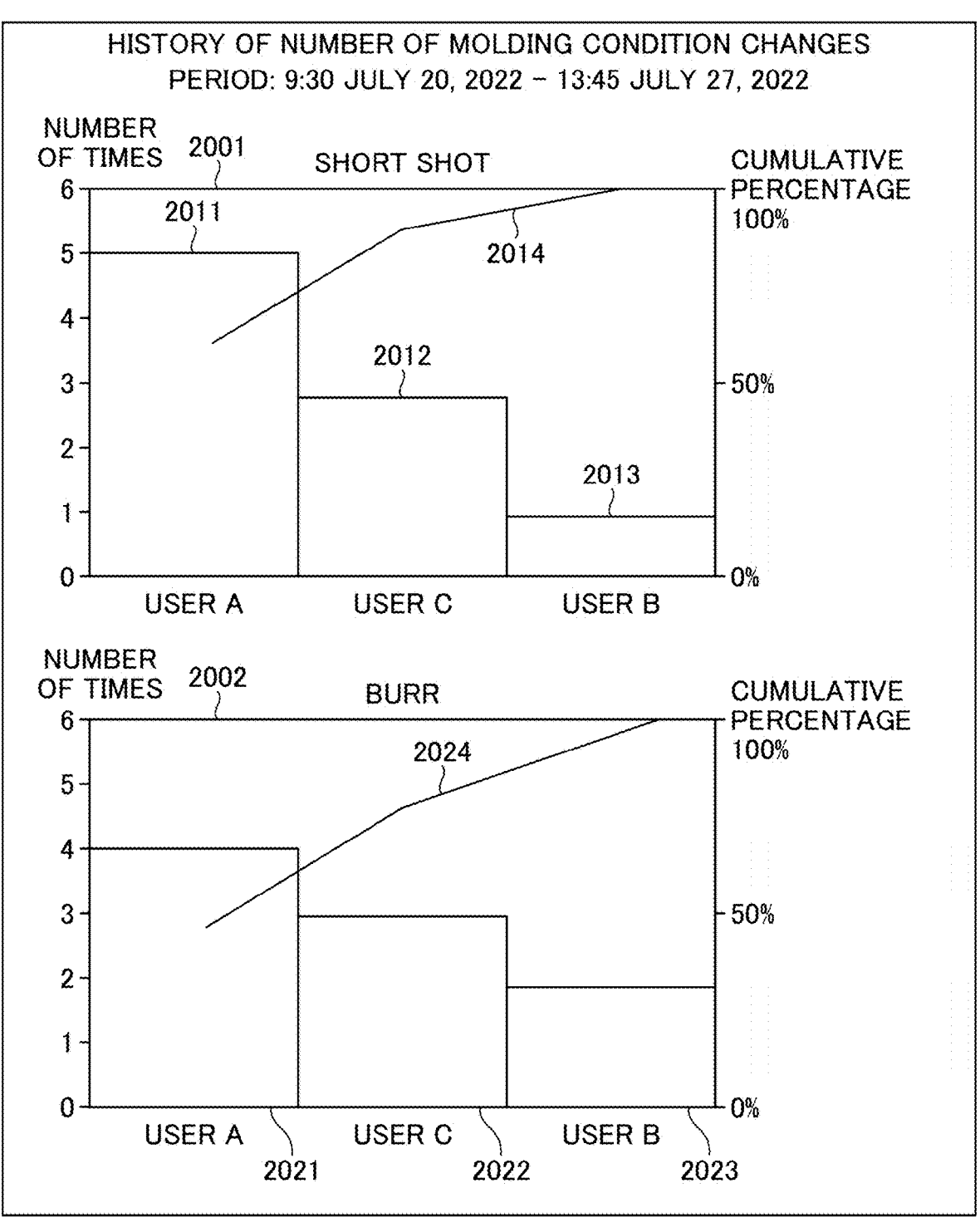
FIG. 10 is a diagram illustrating an example of history of the number of changes in the molding condition displayed on the display according to the embodiment.
Figure 11:
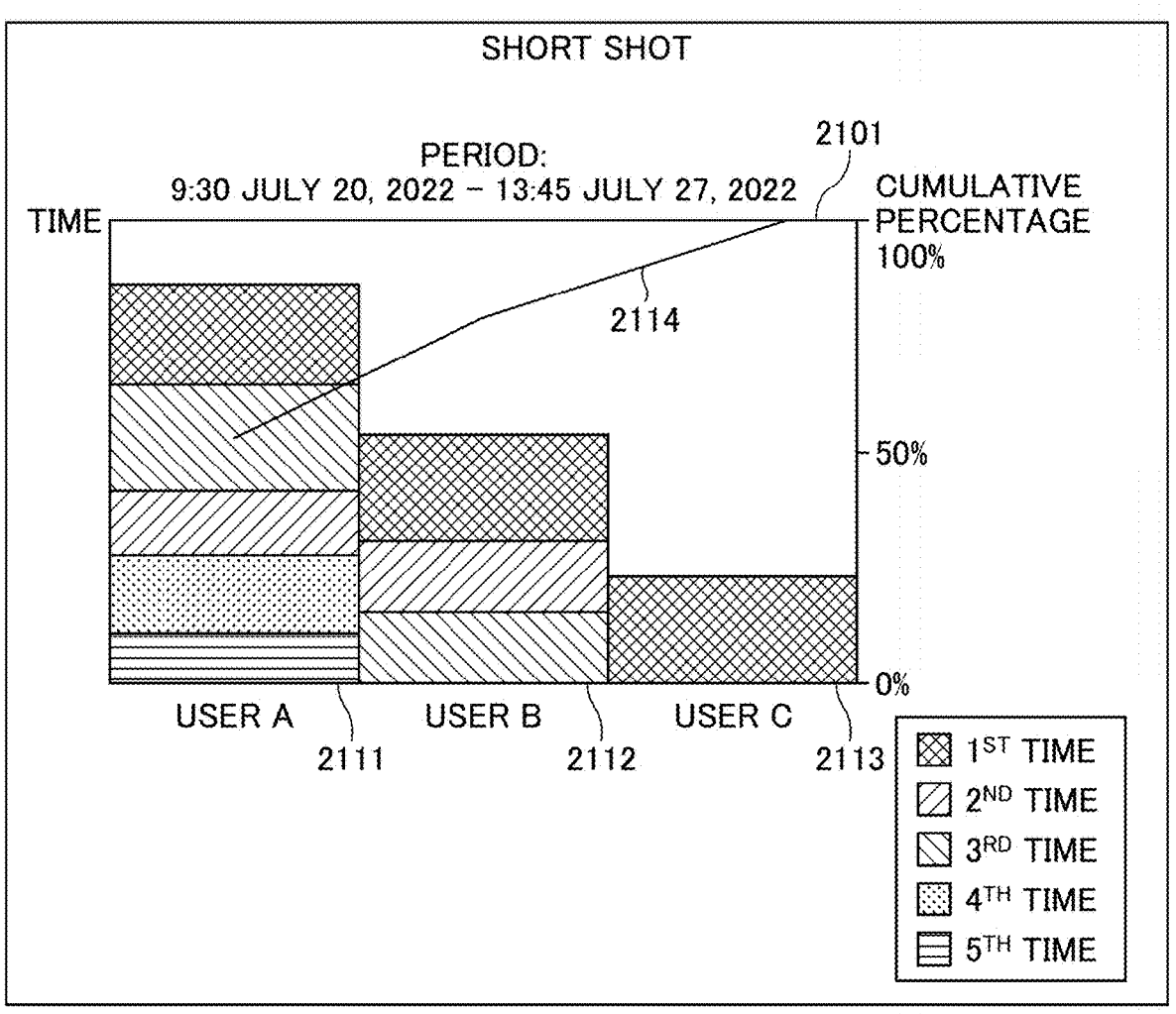
FIG. 11 is a diagram illustrating an example of molding defect elimination history displayed on the display according to the embodiment.

FIG. 10 is a diagram illustrating an example of the screen of history of the number of changes in the molding condition displayed on the display device 760 according to this embodiment. The example illustrated in FIG. 10 is a Pareto chart illustrating the number of times that the molding condition was changed due to a short shot or a burr in a period from 9:30 on July 20 to 13:45 on Jul. 27, 2022. The Pareto chart of the history of the number of changes in the molding condition illustrated in FIG. 10 is generated by referring to the molding condition change history storage part 722 of FIG. 5. Therefore, the Pareto chart of FIG. 10 is displayed by changer. The Pareto chart illustrated in FIG. 11 is also displayed for each changer since the Pareto chart of FIG. 11 is generated by referring to the molding condition change history storage part 722 of FIG. 5.

The Pareto chart 2001 in FIG. 10 illustrates the number of changes in the molding condition due to a short shot, and the Pareto chart 2002 illustrates the number of changes in the molding condition due to a burr.

The display control part 711 extracts one or more records of which the change reason is "Short shot" and which are within the set period from the information stored in the molding condition change history storage part 722, and displays a Pareto chart 2001 indicating the number of changes in the molding condition in a case were a short shot occurred. Furthermore, the display control part 711 extracts one or more records of which the change reason is "Burr" and which are within the set period from the information stored in the stop history storage part 721, and displays a Pareto chart 2002 indicating the number of changes in the molding condition due to a burr.

In each of the Pareto chart 2001 and the Pareto chart 2002, for each changer, the number of changes in the molding condition is indicated by the length of a bar.

In the Pareto chart 2001 of FIG. 10, a bar 2011 indicates the number of changes in the molding condition due to the short shot in a case where User A is a changer, a bar 2012 indicates the number of changes in the molding condition due to a short shot in a case where User C is a changer, and a bar 2013 indicates the number of changes in the molding condition due to a short shot in a case where User B is a changer.

In the Pareto chart 2002 of FIG. 10, a bar 2021 indicates the number of changes in the molding condition due to a burr in a case where User A is a changer, a bar 2022 indicates the number of changes in the molding condition due to a burr in a case where User C is a changer, and a bar 2023 indicates the number of changes in the molding condition due to a burr in a case where User B is a changer.

In the examples illustrated in FIG. 10, it is possible to recognize, for each changer, the number of times that the molding condition was changed due to a defect occurred in the molded product.

Furthermore, in the examples illustrated in the Pareto chart 2001 and the Pareto chart 2002, the bar representing the number of changes is sequenced in descending order of length according to the number of changes, and displayed.

Furthermore, the Pareto chart 2001 illustrates a polyline 2014 indicating the cumulative percentage of the number of changes for each changer, and the Pareto chart 2002 illustrates a polyline 2024 indicating the cumulative percentage of the number of changes for each changer. Then, in the Pareto chart 2001 and the Pareto chart 2002, the cumulative percentage of the total time for each changer will ultimately reach 100%. The administrator can recognize the proportion of the number of changes for each changer by referring to the polyline 2014 or the polyline 2024.

In the display illustrated in FIG. 10, it is possible to recognize the number of changes in the molding condition for each changer. There is a possibility that the number of changes is increased because the changer cannot set an appropriate molding condition and repeatedly changes the molding condition. That is, the difference in the number of changes by a changer may be based on the skills and proficiency level of the changer. In other words, it is considered that the number of times that the molding condition was changed is reduced as the person has skills or is of high proficiency level.

Therefore, in this embodiment, the display control part 711 displays the screen illustrated in FIG. 10, so that the number of changes in the molding condition can be recognized for each changer. Based on the recognition result, the administrator can arrange that, for example, a changer having a small number of changes in the molding condition teaches a method of changing the molding condition to a changer having a large number of changes in the molding condition. Accordingly, the number of changes in the molding condition can be reduced, and an increase in the utilization can be achieved by making arrangement in consideration of the skills or the like of the changer as described above.

FIG. 10 illustrates an example in which the number of changes in the molding condition is indicated for each changer. However, in this embodiment, the figure for indicating the number of changes in the molding condition is not limited to the Pareto chart, and the number of changes in the molding condition may be displayed by an element constituting the figure, such as a bar of a bar graph, a piece of a pie chart, or a value of a line graph. Furthermore, in this embodiment, the display of the figure relating to the change of the molding condition is not limited to only the number of changes in the molding condition. For example, the time required for changing the molding condition may be represented graphically for each changer.

The time required for changing the molding condition may be derived from, for example, information stored in the molding condition change history storage part 722. For example, the time may be derived from one or more records of which the change reason and the changer are the same. In the example illustrated in FIG. 5, there are records with the change reason being "short shot" and the changer being "User C" consecutively. The display control part 711 may display, by a Pareto chart, the time from the earliest time (for example, Jul. 25, 2022 11:09) to the latest time (for example, Jul. 25, 2022 11:19) of the records as the time required for changing the molding condition.

As a method of deriving the time required for changing the molding condition, another method may be used. For example, the change time of the record stored in the molding condition change history storage part 722 may be set as the start time of the change of the molding condition, and the end of the change of the molding condition (in other words, the end time) may be specified by using a defective product determination function of the injection molding machine 10. That is, when a parameter such as pressure detected at the time of injection molding of the injection molding machine 10 deviates from a monitoring range set in the injection molding machine 10 and the molding condition is changed, the controller 700 may regard the time when the parameter comes within the monitoring range after the change of the molding condition by the changer or the like is performed as the end time of the change of the molding condition. The end time of the change of the molding condition may be registered in the molding condition change history storage part 722 or the like in association with the start time.

As another example, in a case where the change time of the record stored in the molding condition change history storage part 722 is set as the start time of the change of the molding condition and the operation reception part 712 receives pressing of a setting end button displayed on the setting screen of the molding condition, the time of the pressing may be regarded as the end time of the change of the molding condition. The end time of the change of the molding condition may be registered in the molding condition change history storage part 722 in association with the start time.

As another example, when the user logs in to change the design condition, the time at which the user logs in may be regarded as the start time of the change of the molding condition, and the time at which the user logs out may be regarded as the end time of the change of the molding condition. The start time and the end time may be registered in the molding condition change history storage part 722.

FIG. 11 is a diagram illustrating an example of the screen of molding defect elimination history displayed on the display device 760 according to this embodiment. The example illustrated in FIG. 11 is a Pareto chart illustrating the total time required for eliminating the molding failure due to a short shot in a period from 9:30 on July 20 to 13:45 on Jul. 27, 2022.

The display control part 711 extracts one or more records of which the change reason is "Short shot" and which are within the set period from information stored in the molding condition change history storage part 722. The display control part 711 then, for each extracted record, derives a start time and an end time of the change of the molding condition, and displays a Pareto chart 2101 illustrating a total time required for eliminating the molding defect due to a short shot. The method of deriving the start time and the end time of the change of the molding condition is as described above, and the description thereof is omitted.

The Pareto chart 2101 indicates, for each changer, the total time required for eliminating the molding defect due to a short shot in terms of the length of a bar.

In the Pareto chart 2101 of FIG. 11, a bar 2111 indicates the total time required for eliminating the molding failure due to a short shot in the case where User A is a changer, a bar 2112 indicates the total time required for eliminating the molding failure due to a short shot in the case where User B is a changer, and a bar 2113 indicates the total time required for eliminating the molding failure due to a short shot in the case where User C is a changer.

In the example illustrated in FIG. 11, in a case where the molding failure occurred multiple times, the total time of the multiple times is indicated by the length of the bar. In the example illustrated in FIG. 11, in one bar, the time required each time of the molding failure occurred is displayed in a different display mode (color or shading). For example, in the Pareto chart 2101, when User A is a changer, it can be recognized that the molding failure occurred five times. Furthermore, the time required for eliminating the molding failure is illustrated for each of the five times. Similarly, for the other changers, the time required each time the molding failure occurred is illustrated. With this displaying manner, for each changer, the number of times that the molding failure occurred and the time required for eliminating the molding failure each time the failure occurred can be recognized.

Furthermore, in the example illustrated in the Pareto chart 2101, the bar representing the total time is sequenced in descending order according to the total time (the length of the bar) and displayed.

In the Pareto chart 2101, a polyline 2114 indicating the cumulative percentage of the total time required for eliminating the molding defect for each changer is illustrated. In the Pareto chart 2101, the cumulative percentage of the total time for each changer will ultimately reach 100%. The administrator can recognize the proportion of the total time required for eliminating the molding defect for each changer by referring to the polyline 2114.

In the display illustrated in FIG. 11, it is possible to recognize the total time required for eliminating the molding defect for each changer. The reason why the total time required for eliminating the molding failure becomes longer is that the time required to set the molding condition becomes longer or that the changer cannot set an appropriate molding condition and thus repeatedly changes the molding condition. That is, there is a possibility that the difference in the total time for each changer may be based on the skills and proficiency level of the changer. In other words, in this embodiment, the skills and the proficiency level of each changer can be recognized by the display illustrated in FIG. 11. Based on the recognition result, the administrator can arrange that, for example, a changer having a shorter total time teaches a method of changing the molding condition to a changer having a longer total time. With this arrangement, the number of changes in the molding condition can be reduced, and an increase in the utilization can be achieved.

In the example illustrated in FIG. 11, an example in which the total time required for eliminating the molding failure is represented by the Pareto chart has been described. However, in this embodiment, the figure for representing the total time required for eliminating the molding failure is not limited to the Pareto chart, and the total time required for eliminating the molding failure may be displayed by an element constituting the figure, such as a bar of a bar graph, a piece of a pie chart, or a value of a line graph. In the example illustrated in FIG. 11, the total time is indicated by the length of the bar of the Pareto chart for each changer. However, the example illustrated in FIG. 11 is not limited to the example in which the total time is displayed by the length of the bar, and for example, the average time may be displayed by a length of a bar of a Pareto chart or a bar graph, a piece of a pie chart, a value of a polyline, or the like. As a method of calculating the average time, for example, the average time may be calculated by dividing the total time by the number of times that the molding failure occurred. Depending on the type of stop, there may be errors occurring with a high frequency for each changer or machine, or errors occurring with a low frequency for each worker or each injection molding machine. Therefore, the method of calculating the average time is not limited to the method of calculating the average time by simply dividing the total time by the number of times that the molding failure occurred. For example, the calculated average time may be adjusted with a calibration value according to the number of times, each worker, or each injection molding machine.

Another Embodiment

In the above-described embodiment, an aspect in which the display device of the injection molding machine 10 is caused to display the Pareto chart has been described. However, in the above-described embodiment, the device for displaying the Pareto chart is not limited to the injection molding machine 10. In another embodiment, an example in which a Pareto chart is displayed in a management system is described.

Figure 12:
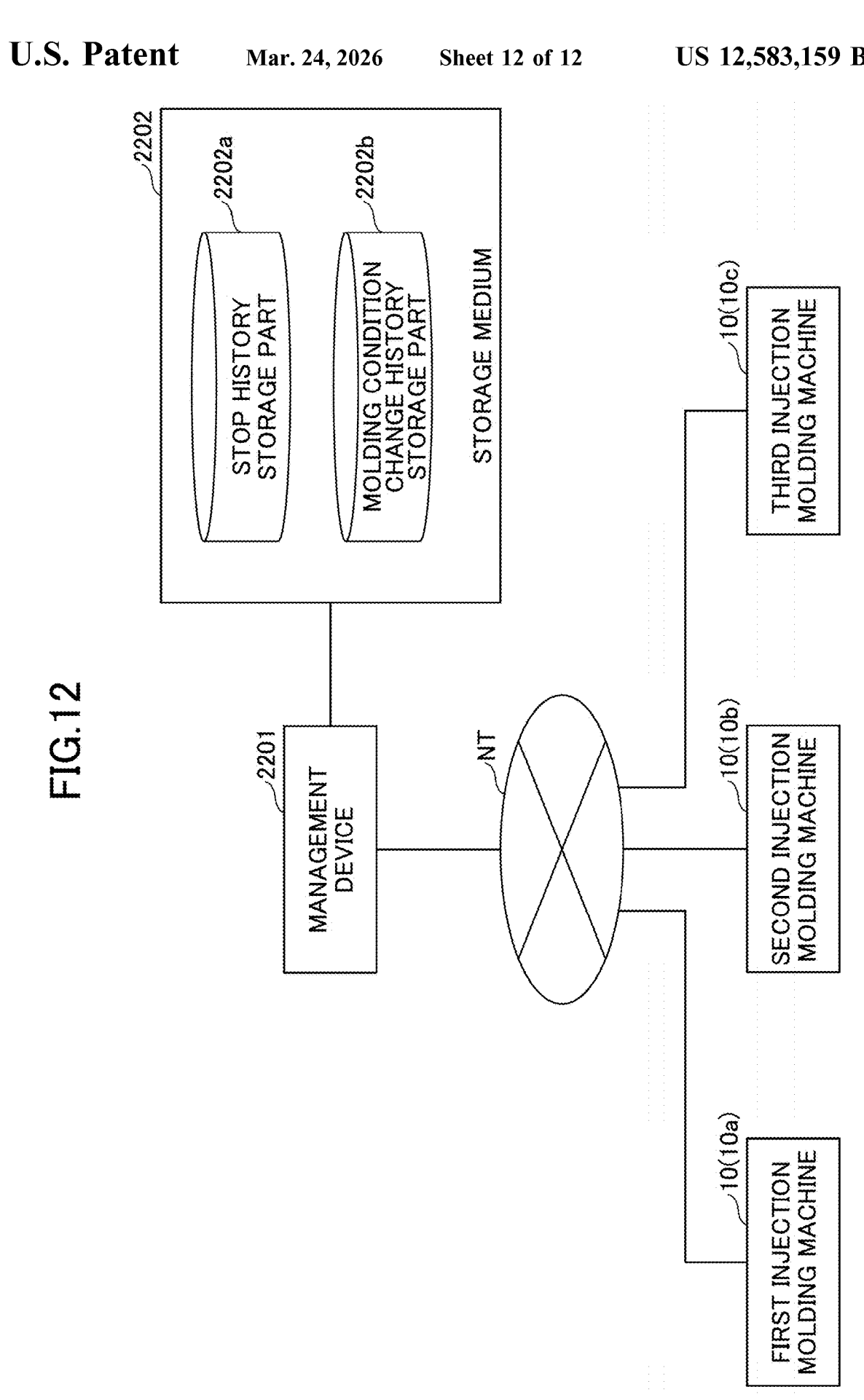
FIG. 12 is a diagram illustrating a configuration of a management system for an injection molding machine according to another embodiment.

FIG. 12 is a diagram illustrating a configuration of a management system for injection molding machines according to this embodiment. The management system illustrated in FIG. 12 includes a management device (management server) 2201, a first injection molding machine 10a, a second injection molding machine 10b, and a third injection molding machine 10c.

The configurations of the first injection molding machine 10a, the second injection molding machine 10b, and the third injection molding machine 10c are the same as those of the injection molding machine 10 of the above-described embodiment, and description thereof will be omitted.

The management device 2201 manages the first injection molding machine 10a, the second injection molding machine 10b, and the third injection molding machine 10c.

The management device 2201 is communicably connected to a storage medium 2202. The storage medium 2202 includes a stop history storage part 2202a and a molding condition change history storage part 2202b. The table configurations of the stop history storage part 2202a and the molding condition change history storage part 2202b are the same as those of the stop history storage part 721 and the molding condition change history storage part 722, and description thereof will be omitted.

The first injection molding machine 10a, the second injection molding machine 10b, the third injection molding machine 10c, and the management device 2201 are connected to each other via a communication network NT. Each of the first injection molding machine 10a, the second injection molding machine 10b, and the third injection molding machine 10c transmits information stored in the stop history storage part 721 and the molding condition change history storage part 722 to the management device 2201.

For example, each time the injection molding machine 10 stops, each of the first injection molding machine 10a, the second injection molding machine 10b, and the third injection molding machine 10c transmits, to the management device 2201, the stop content and type (an example of information indicating the work performed to respond to the stop) in the stop history storage part 721, the user ID indicating the worker who worked to respond to the stop, and the total time, the stop time, and the restart time (an example of information on the time required for performing the work) in association with each other.

Similarly, each of the first injection molding machine 10a, the second injection molding machine 10b, and the third injection molding machine 10c transmits to the management device 2201, every time the molding condition is changed (an example of the work), a change item (an example of the work), a parameter before the change, a parameter after the change, a user ID indicating a changer who has changed the molding condition, and a change time (an example of information on a time required for the work) in association with each other.

The management device 2201 records the transmitted information in the stop history storage part 2202a or the molding condition change history storage part 2202b. Accordingly, the management device 2201 can collectively manage the information of the first injection molding machine 10a, the second injection molding machine 10b, and the third injection molding machine 10c.

The management device 2201 is provided with a display device (not illustrated) (an example of a display). A controller (not illustrated) provided in the management device 2201 reads the program to achieve the same function as that of the controller 700 of the above-described embodiment.

That is, the controller of the management device 2201 refers to the stop history storage part 2202a and the molding condition change history storage part 2202b, and displays a Pareto chart in which the number of times that the work was performed or the time required for performing the work for each worker or each changer can be recognized. The Pareto chart displayed in this embodiment is displayed in the same manner as in the above-described embodiment, and a description thereof will be omitted.

In this embodiment, even the management system can achieve the same effect as the above-described embodiment.

In the above-described embodiment, in the injection molding machine 10 or the management system, the time required for performing the work on the injection molding machine 10 (the total time or the average time) or the number of times that the work was performed can be ascertained for each worker or changer by the figure displayed on the screen. Accordingly, it is possible to determine whether the work performed by each worker or each changer is appropriate. Since the work performed by each worker or each changer can be reviewed to ensure it is appropriate, an increase in the utilization of the injection molding machine 10 can be achieved.

Although the embodiments of the controller for an injection molding machine and the management system for an injection molding machine according to the present disclosure have been described, the present disclosure is not limited to the above-described embodiments and the like. Various changes, modifications, substitutions, additions, deletions, and combinations may be made without departing from the scope of the present disclosure. These are also included in the technical scope of the present disclosure.

What is claimed is:

1. A controller for an injection molding machine, comprising:

processing circuitry configured to store, in a storage, information on an action taken on the injection molding machine, user information indicating a user who has taken the action, and information on time for taking the action in association with each other, with respect to each of a plurality of actions taken on the injection molding machine; and refer to the storage to display, on a display, a number of actions taken by the user or time required for taking the actions by the user in a visually recognizable manner using a figure, with respect to each of a plurality of users indicated in the user information.

2. The controller as claimed in claim 1, wherein the processing circuitry is configured to display, on the display, the number of actions taken by the user or the time required for taking the actions by the user with respect to each of the plurality of users indicated in the user information, using a different graph for each of the plurality of users indicated in the user information or assigning a different item in a graph to each of the plurality of users indicated in the user information.

3. The controller as claimed in claim 1, wherein the processing circuitry is configured to display a total time required for taking the actions or an average time required for taking the actions as the time required for taking the actions.

4. The controller as claimed in claim 3, wherein the processing circuitry is configured to display the figure by arranging constituent elements of the figure according to the total time, the average time, or the number of actions, the constituent elements representing the total time, the average time, or the number of actions.

5. The controller as claimed in claim 3, wherein the processing circuitry is configured to represent the total time, the average time, or the number of actions using a first figure and to represent a cumulative percentage of the total time, the average time, or the number of actions using a second figure.

6. The controller as claimed in claim 1, wherein the information on the action taken on the injection molding machine includes information on at least one of stopping of the injection molding machine by the user, stopping of the injection molding machine based on an abnormality detected in the injection molding machine, and a change in molding conditions of the injection molding machine.

7. A management system comprising:

a plurality of injection molding machines; and processing circuitry configured to manage the plurality of injection molding machines, wherein each of the plurality of injection molding machines is configured to transmit information indicating an action taken on the injection molding machine, user information indicating a user who has taken the action, and information on time required for taking the action in association with each other with respect to each of a plurality of actions taken on the injection molding machine, and wherein the processing circuitry is configured to receive the information indicating the action taken on the injection molding machine, the user information indicating the user who has taken the action, and the information on the time required for taking the action from each of the plurality of injection molding machines, store, in a storage part, the information indicating the action taken on the injection molding machine, the user information indicating the user who has taken the action, and the information on the time required for taking the action in association with each other with respect to each of the plurality of actions taken on the injection molding machine, and refer to the storage part to display, on a display, a number of actions taken by the user or time required for taking the actions by the user in a visually recognizable manner using a figure with respect to each of a plurality of users indicated in the user information.

\* \* \* \* \*